US008788496B2

(12) United States Patent
Darby, Jr. et al.

(10) Patent No.: US 8,788,496 B2
(45) Date of Patent: Jul. 22, 2014

(54) VISUAL ORGANIZATION OF INFORMATION VIA ASSOCIATED GEOSPATIAL DATA

(75) Inventors: George Derrick Darby, Jr., Dunwoody, GA (US); Mark Smith, Ringgold, GA (US); William Quintrell, Chattanooga, TN (US)

(73) Assignee: Trimble Navigation Limited, Sunnyvale, CA (US)

( * ) Notice: Subject to any disclaimer, the term of this patent is extended or adjusted under 35 U.S.C. 154(b) by 361 days.

(21) Appl. No.: 12/894,845

(22) Filed: Sep. 30, 2010

(65) Prior Publication Data

US 2011/0087662 A1 Apr. 14, 2011

Related U.S. Application Data

(60) Provisional application No. 61/247,399, filed on Sep. 30, 2009.

(51) Int. Cl.
*G06F 17/30* (2006.01)

(52) U.S. Cl.
USPC .......................................................... 707/736

(58) Field of Classification Search
None
See application file for complete search history.

(56) References Cited

U.S. PATENT DOCUMENTS

| | | |
|---|---|---|
| 5,003,329 A | 3/1991 | Itabashi |
| 5,087,916 A | 2/1992 | Metzdorff et al. |
| 5,103,250 A | 4/1992 | Arifuku et al. |
| 5,247,356 A | 9/1993 | Ciampa |
| 5,506,644 A | 4/1996 | Suzuki et al. |
| 5,517,419 A | 5/1996 | Lanckton et al. |
| 5,581,299 A | 12/1996 | Raney |
| 5,596,494 A | 1/1997 | Kuo |
| 5,633,946 A | 5/1997 | Lachinski et al. |
| 5,646,207 A | 7/1997 | Schell |
| 5,689,742 A | 11/1997 | Chamberlain |
| 5,719,773 A | 2/1998 | Choate |
| 5,768,640 A | 6/1998 | Takahashi et al. |
| 5,845,161 A | 12/1998 | Schrock et al. |

(Continued)

FOREIGN PATENT DOCUMENTS

| | | |
|---|---|---|
| JP | 2009-140402 | 6/2009 |
| KR | 10-2009-0002531 | 1/2009 |

OTHER PUBLICATIONS

USGS ("Export GeoJpeg"), Sep. 4, 2007, U.S.G.S. Planetary GIS Web Server—PIGWAD, p. 1.*

(Continued)

*Primary Examiner* — Rehana Perveen
*Assistant Examiner* — Alexander Khong

(57) ABSTRACT

In a method of organizing information, a plurality of diverse data items is accessed. The diverse data items are related to a physical location. The diverse data items that are accessed comprise at least a non-visual data item and a visual imagery data item, and include geospatial data associated with the individual accessed data items. The diverse data items are parsed by data type and stored in a data store such that the diverse data items are accessible by one or more of the geospatial data associated with the individual data items. Diverse data items related to the physical location are processed to produce an integrated image displayable via a web viewer. The processing occurs in response to receiving a request regarding the physical location. The integrated image comprises an integration of at least two of the stored diverse data items.

47 Claims, 27 Drawing Sheets

(56) References Cited

U.S. PATENT DOCUMENTS

| | | | |
|---|---|---|---|
| 5,897,728 | A | 4/1999 | Cole et al. |
| 5,902,347 | A | 5/1999 | Backman et al. |
| 5,913,078 | A | 6/1999 | Kimura et al. |
| 5,966,122 | A | 10/1999 | Itoh |
| 5,991,690 | A | 11/1999 | Murphy |
| 6,009,359 | A | 12/1999 | El-Hakim et al. |
| 6,076,917 | A | 6/2000 | Wen |
| 6,128,446 | A | 10/2000 | Schrock et al. |
| 6,222,985 | B1 | 4/2001 | Miyake et al. |
| 6,282,362 | B1 | 8/2001 | Murphy et al. |
| 6,337,951 | B1 | 1/2002 | Nakamura |
| 6,346,980 | B1 | 2/2002 | Tani et al. |
| 6,504,571 | B1 | 1/2003 | Narayanaswami et al. |
| 6,574,561 | B2 | 6/2003 | Alexander et al. |
| 6,597,818 | B2 | 7/2003 | Kumar et al. |
| 6,690,883 | B2 | 2/2004 | Pelletier |
| 6,732,162 | B1 | 5/2004 | Wood et al. |
| 6,868,340 | B2 | 3/2005 | Alexander et al. |
| 7,106,328 | B2 | 9/2006 | Royan |
| 7,167,187 | B2 | 1/2007 | Scott et al. |
| 7,191,056 | B2 | 3/2007 | Costello et al. |
| 7,234,106 | B2 | 6/2007 | Simske |
| 7,248,285 | B2 | 7/2007 | Needham |
| 7,283,975 | B2 | 10/2007 | Broughton |
| 7,313,604 | B2 | 12/2007 | Wood et al. |
| 7,411,493 | B2 | 8/2008 | Smith |
| 7,465,323 | B2 | 12/2008 | Au et al. |
| 7,466,244 | B2 | 12/2008 | Kimchi et al. |
| 7,482,973 | B2 | 1/2009 | Tucker et al. |
| 7,508,840 | B2 | 3/2009 | Delaney |
| 7,634,380 | B2 | 12/2009 | Martin et al. |
| 7,664,233 | B1 | 2/2010 | Kirchmeier et al. |
| 7,720,703 | B1 | 5/2010 | Broughton |
| 7,724,130 | B2 | 5/2010 | Norstrom et al. |
| 7,813,741 | B2 | 10/2010 | Hendrey et al. |
| 8,060,518 | B2 | 11/2011 | Timmons |
| 8,224,867 | B2 | 7/2012 | Evans |
| 2004/0068352 | A1* | 4/2004 | Anderson ............ 701/25 |
| 2004/0168148 | A1 | 8/2004 | Goncalves et al. |
| 2004/0203571 | A1 | 10/2004 | Hashizume |
| 2005/0034062 | A1 | 2/2005 | Bufkin et al. |
| 2005/0223337 | A1 | 10/2005 | Wheeler et al. |
| 2006/0061595 | A1 | 3/2006 | Goede et al. |
| 2006/0197763 | A1* | 9/2006 | Harrison et al. ......... 345/441 |
| 2006/0217105 | A1 | 9/2006 | Kumar |
| 2007/0010924 | A1 | 1/2007 | Otani et al. |
| 2007/0076920 | A1 | 4/2007 | Ofek |
| 2007/0141976 | A1* | 6/2007 | Shimakawa et al. ...... 455/2.01 |
| 2007/0294284 | A1* | 12/2007 | Evans ..................... 707/102 |
| 2008/0258881 | A1 | 10/2008 | Manson et al. |
| 2008/0258967 | A1 | 10/2008 | Manson et al. |
| 2008/0261627 | A1 | 10/2008 | Manson et al. |
| 2008/0262727 | A1 | 10/2008 | Manson et al. |
| 2008/0262733 | A1 | 10/2008 | Manson et al. |
| 2008/0262734 | A1 | 10/2008 | Manson et al. |
| 2008/0263097 | A1 | 10/2008 | Manson et al. |
| 2008/0263174 | A1 | 10/2008 | Manson et al. |
| 2008/0284587 | A1 | 11/2008 | Saigh et al. |
| 2009/0024574 | A1* | 1/2009 | Timmons ............... 707/3 |
| 2009/0132316 | A1 | 5/2009 | Florance et al. |
| 2009/0174768 | A1 | 7/2009 | Blackburn et al. |

OTHER PUBLICATIONS

Shih et al. ("The Inspections of As-built Construction Records by 3D Point Clouds"), CIFE, 2004, p. 1-18.*

Pawelka, Elizabeth "Make your 3270 applications accessible from PDAs and cell phones", *CCR2: A Publication for the IBM System z Software Community*, Issue 6., (2008),6 pages.

Luhmann, T. et al., "Close Range Photogrammetry", *Whittles Publishing*, ISBN 0-470-10633-6, (2006).

"UpNext: 3D Local Search and Community.", www.upnext.com, (2009).

"You City", www.youcity.com, (2009).

Agrios, Bronwyn et al., "Get in Touch with Volunteered Geographic Information", ArcUser www.esri.com, (Summer 2010),50-55.

Qtaishat, K. S., "Assessing the Performance of Different Direct-Georeferencing Strategies", *Institute of Engineering Surveying and Space Geodesy, University of Nottingham*, ASPRS 2006 Annual Congference, Reno, NV,(May 2006),9 pages.

Schwarz, Klaus-Peter "Aircraft Position and Attitude Determination by GPS and INS", *International Archives of Photogrammetry and Remote Sensing*, vol. XXXI, Part B6, Vienna., (1996),7 pages.

Mostafa, Mohamed M., "Digital Image Georeferencing From a Multiple Camera Source by GNS/INS", *ISPRS Journal of Photogrammetry and Remote Sensing*, vol. 56, Issue 1, (Jun. 2001),12 pages.

"PCT/US2010/051015 PCT Search Report and Written Opinion", (Apr. 29, 2011),10 pages.

* cited by examiner

PLAN VIEW - DESIGN

Weather for Zipcode 68818
June, 2010

| Date In June | Avg. Temp. (°F) | Precip. (Inches) |
|---|---|---|
| 1 | 85 | 0.00 |
| 2 | 83 | 0.00 |
| 3 | 79 | 0.00 |
| 4 | 84 | 0.00 |
| 5 | 86 | 0.00 |
| 6 | 87 | 0.00 |
| 7 | 80 | 0.00 |
| 8 | 78 | 4.10 |
| 9 | 77 | 2.00 |
| 10 | 80 | 3.00 |
| 11 | 84 | 0.00 |
| 12 | 85 | 0.25 |
| 13 | 89 | 0.00 |
| 14 | 91 | 0.00 |
| 15 | 93 | 0.00 |
| 16 | 88 | 0.50 |
| 17 | 90 | 0.00 |
| 18 | 93 | 0.00 |
| 19 | 95 | 0.00 |
| 20 | 95 | 0.00 |
| 21 | 96 | 0.00 |
| 22 | 81 | 1.50 |
| 23 | 90 | 0.00 |
| 24 | 92 | 0.00 |
| 25 | 94 | 0.00 |
| 26 | 97 | 0.00 |
| 27 | 96 | 0.00 |
| 28 | 90 | 0.00 |
| 29 | 91 | 0.00 |
| 30 | 93 | 0.00 |

SUPERVISOR'S SITE NOTEBOOK
AURORA RECREATION CENTER PROJECT

LOCATION: 40.891N, 98.021W

DATE: JUNE 10, 2010

This is the first day of heavy rain. Schedule has slipped three days due to ground being too muddy to get concrete trucks close enough to the build site in order to pour the foundation on June 8$^{th}$, June 9$^{th}$, and June 10$^{th}$. No rain is forecast for tomorrow, June 11$^{th}$, so anticipate that we will begin pouring foundation.

The shipping container of parts for securing foundation forms arrived today. It would have been three days late in arriving but for the rain which delayed pouring of the foundation for three days.

FIG. 4F

NORTH WEST AERIAL PERSPECTIVE – AS BUILT
Southeast and Downward From
40.893N, 98.020W @ 20100622/1504UTC NORTH WEST ELEVATION – AS BUILT
Viewing Southeast From
40.893N, 98.0219W @ 20100623/1820UTC

CRANE OPERATION LOG — 485

| Date | Operation | LATITUDE | LONGITUDE |
|---|---|---|---|
| 20100622/1700UTC | Move | 40.8911N | 95.2356W |
| 20100622/1701UTC | Move | 40.8912N | 95.2355W |
| 20100622/1702UTC | Lift | 40.8913N | 95.2357W |
| ... | ... | ... | ... |
| 20100622/1759UTC | Move | 40.8914N | 95.2358W |

CONTAINER TRACKING DATA LOG

| Date | LATITUDE | LONGITUDE |
|---|---|---|
| June 1, 2010 | 38.971N | 95.235W |
| June 2, 2010 | 38.971N | 95.235W |
| June 3, 2010 | 38.971N | 95.235W |
| June 4, 2010 | 38.971N | 95.235W |
| June 5, 2010 | 38.971N | 95.235W |
| June 6, 2010 | 38.971N | 95.235W |
| June 7, 2010 | 38.971N | 95.235W |
| June 8, 2010 | 38.971N | 95.235W |
| June 9, 2010 | 40.820N | 98.680W |
| June 10, 2010 | 40.891N | 98.0217W |
| June 11, 2010 | 40.891N | 98.0217W |
| June 12, 2010 | 40.891N | 98.0217W |
| June 13, 2010 | 40.891N | 98.0217W |
| June 14, 2010 | 40.891N | 98.0217W |
| June 15, 2010 | 40.891N | 98.0217W |
| June 16, 2010 | 40.891N | 98.0217W |
| June 17, 2010 | 40.891N | 98.0217W |
| June 18, 2010 | 40.891N | 98.0217W |
| June 19, 2010 | 40.891N | 98.0217W |
| June 20, 2010 | 40.891N | 98.0217W |
| June 21, 2010 | 40.891N | 98.0217W |
| June 22, 2010 | 40.891N | 98.0217W |
| June 23, 2010 | 40.891N | 98.0217W |
| June 24, 2010 | 40.891N | 98.0217W |
| June 25, 2010 | 40.891N | 98.0217W |
| June 26, 2010 | 40.891N | 98.0217W |
| June 27, 2010 | 40.891N | 98.0217W |
| June 28, 2010 | 40.891N | 98.0217W |
| June 29, 2010 | 40.891N | 98.0217W |
| June 30, 2010 | 40.891N | 98.0217W |

FIG. 4J

NORTH WEST ELEVATION – INTEGRATED DESIGN/AS-BUILT &
OVERLAY OF REMAINING PROJECT SCHEDULE

700

RECEIVE A PLURALITY OF DIVERSE DATA ITEMS RELATED TO A PHYSICAL LOCATION, THE DIVERSE DATA ITEMS RECEIVED WITH GEOSPATIAL DATA ASSOCIATED WITH INDIVIDUAL DATA ITEMS OF THE DIVERSE DATA ITEMS, THE DIVERSE DATA ITEMS COMPRISING AT LEAST A NON-VISUAL SENSOR DATA ITEM AND A VISUAL IMAGERY DATA ITEM
710

↓

PARSE THE DIVERSE DATA ITEMS BY DATA TYPE
720

↓

*PREPROCESSING THE DIVERSE DATA ITEMS BASED UPON A DETERMINED DATA TYPE FOR EACH DIVERSE DATA ITEM*
*725*

↓

STORING THE DIVERSE DATA ITEMS IN A DATA STORE SUCH THAT THE DIVERSE DATA ITEMS ARE ACCESSIBLE BY ONE OR MORE OF THE GEOSPATIAL DATA ASSOCIATED WITH THE INDIVIDUAL DATA ITEMS
730

↓

*IN RESPONSE TO RECEIVING A REQUEST REGARDING THE PHYSICAL LOCATION, PROCESSING THE DIVERSE DATA ITEMS RELATED TO THE PHYSICAL LOCATION TO PRODUCE AN INTEGRATED IMAGE DISPLAYABLE VIA A WEB BROWSER, THE INTEGRATED IMAGE COMPRISING AN INTEGRATION OF AT LEAST TWO OF THE STORED DIVERSE DATA ITEMS*
*740*

↓

*PROVIDE THE INTEGRATED IMAGE IN RESPONSE TO THE REQUEST*
*750*

VISUAL ORGANIZATION OF INFORMATION VIA ASSOCIATED GEOSPATIAL DATA

RELATED U.S. APPLICATION

This application claims priority to the provisional patent application Ser. No. 61/247,399, entitled "Connected Community," with filing date Sep. 30, 2009, and assigned to the assignee of the present invention, which is herein incorporated by reference in its entirety.

BACKGROUND

A variety of situations being managed or undertaken include a great deal of information. On one end of a spectrum, large situations may include the likes of large scale construction projects, response activities, and recovery activities. Some examples of a large scale construction projection include construction of a bridge or a multi-story building. Some examples of response activities include response to disaster situations such as fires, on going floods, ongoing hurricanes, and ongoing military or police/fire operations. Some examples of disaster recovery activities include the coordination of agencies, businesses, media, workers, and volunteers in the cleanup following a large oil spill or in the recovery efforts after a hurricane, tornado, or earthquake or other natural disaster.

Moreover, in the information age even small situations, on the other end of a spectrum, can include a large volume of information. Small situations may include, among other things, smaller versions of the projects/activities described above. An example of a small project is a small scale new construction project, such as construction of a house. Another example of a small project is a small scale infrastructure improvement project, such as resurfacing of a city street. An example of a small activity is a social or entertainment venue, such as an outdoor wedding or concert. An example of small recovery activity can include cleanup activities following a train derailment in a rural location.

A situation, large or small, may include, among other information: data from government sources such as approval to build or operate and/or information regarding government inspections, reports, or emergency responses; finance and budget data; data from engineers regarding the situation (e.g., design drawings); requests for data from an owner, customer, or other party interested in the situation; data from a site supervisor of the situation; data from workers involved with the situation; data regarding equipment being used; alerts regarding the situation; environmental data (e.g., weather); personnel data; progress data; event data; and situation diary/notebook data.

Keeping track of information associated with one or more situations can be a complex endeavor. Moreover, such information is typically diverse and from a variety of sources. This means that a variety of data formats and access methods (i.e., software utilities) may be required in order to make use of the information, thus complicating the task of effectively utilizing the information. Throughout the lifespan of the situation, different information may be required by different entities that are involved, however, it is not always known in advance what information will be needed by what entity at what point in time. Because of these factors, large amounts of information related to a situation can become unwieldy to manage, access, and exploit, thus resulting in information being stored and/or cobbled together in fashions that are neither efficient nor particularly useful for those requiring the information for decision making or other purposes.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

FIGS. 4A-4K illustrate several individual examples of diverse data items which may be accessed regarding a geographic location, in accordance with one or more embodiments.

FIG. 7 is a flow diagram of an example method of organizing information, in accordance with various embodiments.

DESCRIPTION OF EMBODIMENTS

Figure 1:
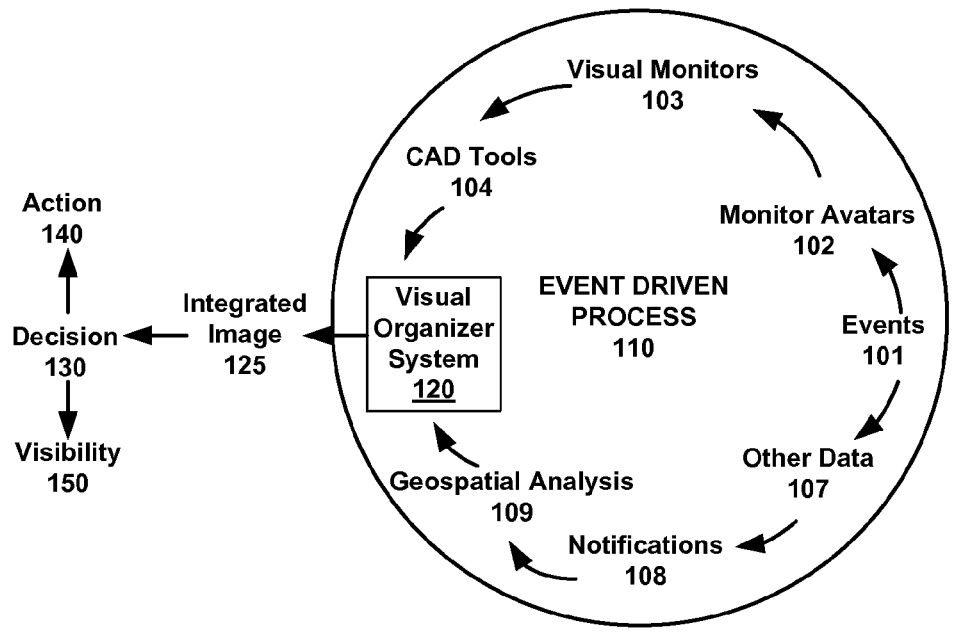
FIG. 1 provides an example overview of the concept of visual organization as involved in an event driven process for making a decision related to a situation, in accordance with an embodiment.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "receiving," "parsing," "storing," "processing," "preprocessing," "providing," "including," "associating," "creating," "accessing," "associating," "preparing," "combining," "sending," "displaying," or the like, refer to the actions and processes of a computer system or similar electronic computing device (or portion thereof) such as, but not limited to one or more or some combination of: a visual organizer system, a request generator, an Internet coupled computing device, and a computer server. The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s). Under the direction of computer-readable instructions, the electronic computing device may carry out operations of one or more of the methods described herein.

Overview of Discussion

Example techniques, systems, and methods for organization of information via associated geospatial data are described herein. Discussion begins with a glossary of selected terms that are employed frequently herein and then proceeds to a high-level description of the concept of visual organization of information related to a situation. This high-level description is meant to set the stage for an understanding of some examples of how a visual organizer system, according to embodiments of the present invention, may be utilized to organize information about a situation to assist a user in attaining situational awareness. An example visual organizer system, and components thereof, is then described. Discussion continues with description of several examples of diverse data items which the example visual organizer system may receive and process into one or more integrated images that are displayable via a web viewer. Some preprocessing techniques and examples thereof, which may be utilized in some embodiments, are discussed. Several example integrated images, which may be generated by the visual organizer system, are described. Operation of the visual organizer system, and components thereof, is then further described conjunction with description of example methods of organizing information and an example method of visually displaying diverse data items via a web viewer. Finally, an example computer system is described, with which or upon which various systems, components, and/or methods (or portions thereof) may be implemented.

Glossary of Selected Terms

This Glossary provides definitions for a number of selected terms that are employed frequently herein.

"As-built." As utilized herein, the term as-built generally means the condition (measurements, location, features, etc.) or state that an existing or in progress item of interest actually exists in at a point in time, which may differ from plan/design conditions or state for such item of interest. Among other things, as-built data may include images, measurements, and drawings which reflect the as-built condition of an item of interest (e.g., a structure) at a particular time. An as-built data item may highlight a difference between a design of the item of interest and the way that the item of interest was actually built. For example, position coordinates of a foundation may be moved slightly from design to as-built, and this may be indicated by an as-built drawing.

"Data item." As utilized herein, the term data item refers to a unit of data or a digital file. A data item may be electronically transmitted from one electronic device to another, and may be stored upon computer-readable storage media. Data items may exist in a diverse assortment of file formats/data structures and may be sourced from or produced by a diverse variety of sources. For this reason a plurality of data items in different formats and/or from different sources is referred to herein as "diverse data items."

"Design." As utilized herein, the terms design or as-designed refer to architectural and/or engineering designs such as blueprints or computer-aided design (CAD) files or the like which are related to design of a building, a structure, or earthworks project, among others things.

"Geocoded." As used herein, the term geocoded denotes that an item has been associated with geographic coordinates (which may be expressed, for example, as latitude and longitude and sometimes elevation relative to the Earth's surface). Geographic Information Systems typically include geocoded files/data. Geocoded data may be included as a field of a set of data and/or as metadata associated with data or a file. For example, a digital image file may be tagged ("geo-tagged") in its metadata with coordinates of the location at which the digital image is captured. Other data items may similarly be geocoded.

"Geospatial." As utilized herein, the term geospatial refers to identifying geographic data related to a location relative to the Earth's surface. Geospatial data can convey a location on, above, or below an Earth's surface. Geocoded data is one form of geospatial information. Besides geocoded data, geospatial data may additionally or alternatively include: address information, zip code information, and legal land descriptions (e.g., county/township/range and the like). Geospatial data may be associated with a data item, such as by being included within the data item, within metadata associated with the data item, or within another digital file that is associated with the data item.

"Global Navigation Satellite System" (GNSS). As used herein, the term GNSS refers to a constellation of satellites that can be used to determine position and/or to navigate. Examples of such GNSS constellation(s) of satellites which, alone or in combination with one another, may be included under the umbrella of the term GNSS, include but are not limited to: the Global Positioning System (GPS); Global Orbiting Navigation Satellite System (GLONASS); Compass/Beidu system; and Galileo system (presently under development). Among other things, GNSS may also include aspects of supplemental ground based position determining systems and other satellite based position determining systems such as: differential GPS; Wide Area Augmentation System (WAAS); and Real-Time Kinematics (RTK) systems.

"GNSS receiver." As used herein, a GNSS receiver is an electronic device which receives signals from one or more GNSS satellites and/or from other supplemental sources and uses such signals for position determination and/or navigation. A GNSS receiver may be a stand-alone electronic device or may be imbedded within or coupled with another electronic device such as an electronic computing device, a surveying device, a tracking/reporting device, a cellular phone, a multi-media device, and a digital image capture device (digital camera, digital video recorder, digital camcorder), among others.

"Link." As used herein, the term link refers to an association or relationship between two data objects. Similarly, a "link indicator" as used herein is a displayed and user selectable field which links a data item, such as a displayed image, in which the link indicator is displayed to a second data item which is in some way associated or related to the first data item. In many ways, a link indicator operates in the same fashion as an embedded link on a webpage.

"Render." As used herein, the term render refers to image processing of imagery (typically digital imagery) to produce final visual display of an object or group of objects. Rendering describes a combination of activities, which may include: 1) translating data into some known, shared format; 2) automatically understanding/determining a target web viewer's capacity for detail/content and reacting accordingly; and/or 3) automatically understanding/determining current bandwidth available to a target web viewer at a given time and adjusting content generation accordingly. One, more than one, or all of these three activities (and/or other activity(ies)) may be accomplished to satisfy a request to obtain a given scene in the form of an integrated image viewable via a web viewer.

Rendering may involve the use of computers, such as render servers, which run image processing software. Among other things, rendering may be utilized to: combine two or more images into a single displayable image; to add alphanumeric or tabular content to an image or combination of images; to resize an image or combination of images; to change the file format of an image or combination of images; and to add displayable items such as link indicators to an image or combination of images. Rendering also encompasses the process of taking source content (historical or live streamed) and "rendering" it into a format and detail level best consumed by and suitable for viewing upon a given web viewer. Rendering may involve generating streaming/streamable content which may include one or more of still images, video images, audio, and/or other content.

A certain amount of programmed intelligence and decision making involved are involved in rendering information. For example, if source is an 80 MB image that is much too large for a particular user's web viewer to handle, in one embodiment, a render server determines a zoom level and screen size/resolution associated with the web viewer so that it can provide render to the capabilities of the particular web viewer. Alternatively, a render server may select elements/detail to remove from an image, image stream, or rendered content such that file size is reduced to a size which is tenable to a target web viewer. Similarly, in one embodiment, if a source file being rendered into an integrated image is a strange/proprietary format that a particular web viewer cannot recognize (e.g., a CAD vector file), a render server automatically determines what file type(s) the web viewer can handle and converts the strange/proprietary file format to a file type that can be handled by the target web viewer.

"Scene." As used herein, a scene refers to a specific view combining selected assets, renderings, etc. at a given date/time and location. The Visual Organizer System described herein enables the composition of viewable scenes (in the form of electronic files of integrated images) to show relevant data at the desired time and place.

"Situation." As used herein, a situation refers to one or more of a variety of activities that may be managed, overseen, or undertaken. Some non-limiting examples include construction projects, response activities (e.g., response to emergencies), and recovery activities (e.g., activities such as cleanup and rebuild after a disaster.

"Web viewer." As used herein, a web viewer is a client side application interface that can display content which is served up over the World Wide Web, over Internet, from a website, or via some other network. Depending upon implementation, a web viewer may or may not involve the use of a web browser. Additionally, it is appreciated that although the word "web" is used the term "web viewer," a website may not be involved in the use of the web viewer. A web viewer may be implemented on a computer, personal digital assistant, smart phone, net book, e-reader, and/or tablet computer, among other devices.

General Description of a Visual Organization

FIG. 1 provides an example overview of the concept of visual organization as involved in an event driven process 110 for a decision 130 related to a situation 100, in accordance with an embodiment. As can be seen decision 130 is an outcome of event driven process 130, in which an entity such as person(s) or organization(s) synthesizes information. Among other things, a decision 130 may be a determination by an entity to take an action 140 or simply a point at which an entity has attained sufficient visibility 150 that situation 100 or an event 101 of the situation 100 is understood by an entity. Typically, improved synthesis of available information will result in decision(s) 130 which are: of better quality or outcome, better informed, and/or more quickly reached. As can be seen, a variety of factors produce the data items which form the information that a decision is based upon. Among other factors, in various embodiments, these factors that provide data items related to a situation may include events 101, monitor avatars 102, visual monitors 103, computer-aided design tools 104, other data 107, notifications 108, and geospatial analysis 109.

Events 101 are a diverse category of data item generators that span a spectrum which includes events such as: a failure of a piece of equipment, an earthmoving event on a construction site, completion of a task on a construction project, the occurrence of an earthquake, or the occurrence of a rain storm. Occurrence or absence of occurrence of events 101 cause or drive the creation of various data items which can then be collected, compare, contrasted, and integrated with other data items by a decision making entity. It is appreciated that even an onsite decision making entity (e.g., a construction foreman) may be overwhelmed with diverse data items or oblivious to some data items that are available. Visual organizer system 120 assists a decision making entity or other entity by integrating various diverse data items into integrated image 125 to, in effect, augment reality for an entity and allow information content to be more efficiently presented for evaluation by the entity to assist in making decision 130.

As a non-limiting example, augmented reality can provide additional information used in monitoring equipment and services. For example, a service may allow for the monitoring of a job site that is engaged in using various equipments. The monitoring service may provide a video of the job site which displays the equipment being used in real time. Augmented Reality would provide information, regarding the equipment, beyond what is displayed by video. For example, a video may be displaying the operation of a crane being used at a job site. Augmented reality provided by an integrated image 125 may integrate with the video a display of one or more aspects of information regarding the crane including, but not limited to, maintenance, ownership, rental agreements, age of the crane, identity of the crane operator, hours the crane has been in operation, current weather, weather forecasts, weight ratings the crane is rated to lift, what weight the crane is currently lifting, etc. The information may display in real time as a real time video of the equipment is being displayed.

It should be appreciated that such augmented reality provided by an integrated image 125 is not limited to equipment and job sites, but instead may be utilized in various other situations. For example an integrated image 125 may be utilized to monitor the regular use of bridges, roads, and buildings and may be used to monitor nature or other events. As will be described herein in some embodiments, an entity may select data items which are integrated together to form integrated image 125.

With continued reference to FIG. 1, monitor avatars 102 include sensors that monitor a particular area on the Earth or even a specific item, piece of equipment, or piece of machinery. The output of monitor avatars 102 is monitor data items which may include position data, activity data, media, or metrics about the thing or area being monitored. For example, a piece of equipment or a container may include a device which monitors and reports position or other data such as activity or use information. Such monitoring by monitor avatars may provide data items in a delayed fashion, in near real-time, and/or in real-time.

Visual monitors 103 include still and video images related to a situation. Video images may include sound in some embodiments.

CAD tools 104 include tools which are used to design plans related to a structure or building, earthwork, or the like. CAD tools provide data items such as as-designed drawings from a variety of views.

Other data 107 is a catch-all category for data being streamed, collected, or automatically reported about a situation or events related to a situation. Other data 107 may include data items that allow aspects of the event to be monitored and/or captured and also allow appropriate entities to be alerted or notified to pay attention. In one embodiment, an example of other data may be seismographic data.

Notifications 108 can include an entity being notified by a person or an avatar about an important aspect of an event or situation. In one embodiment, when a seismic event is noted in seismographic data, a notification 108 is sent to a particular entity (e.g., a fire department) when an earthquake occurs in an area of responsibility of the interest to the entity.

Geospatial analysis 109 includes techniques and tools that allow accurate real-world 1D, 2D, 3D, and/or 4D (time component as 4th dimension) modeling, aggregation, and or analysis of data items based upon associated geospatial information. For example geospatial analysis may allow a data item associated with a zip code to be aggregated with a data item that is geocoded as being associated with a geographic location within the zip code.

Actions 140 that an entity may decide to take are based on knowledge derived from the captured data that is presented for analysis in one or more integrated images 125 provided by visual organizer system 120. A decision 130 to take an action 140 can impact safety, profitability, schedule of events, and/or loss of life, among other things.

Visibility 150 can be though of as the incorporation and presentation of decisionable/actionable information into an intelligent scene such that an entity attains situational awareness or can convey situational awareness to another entity.

Example Visual Organizer System

Figure 2:
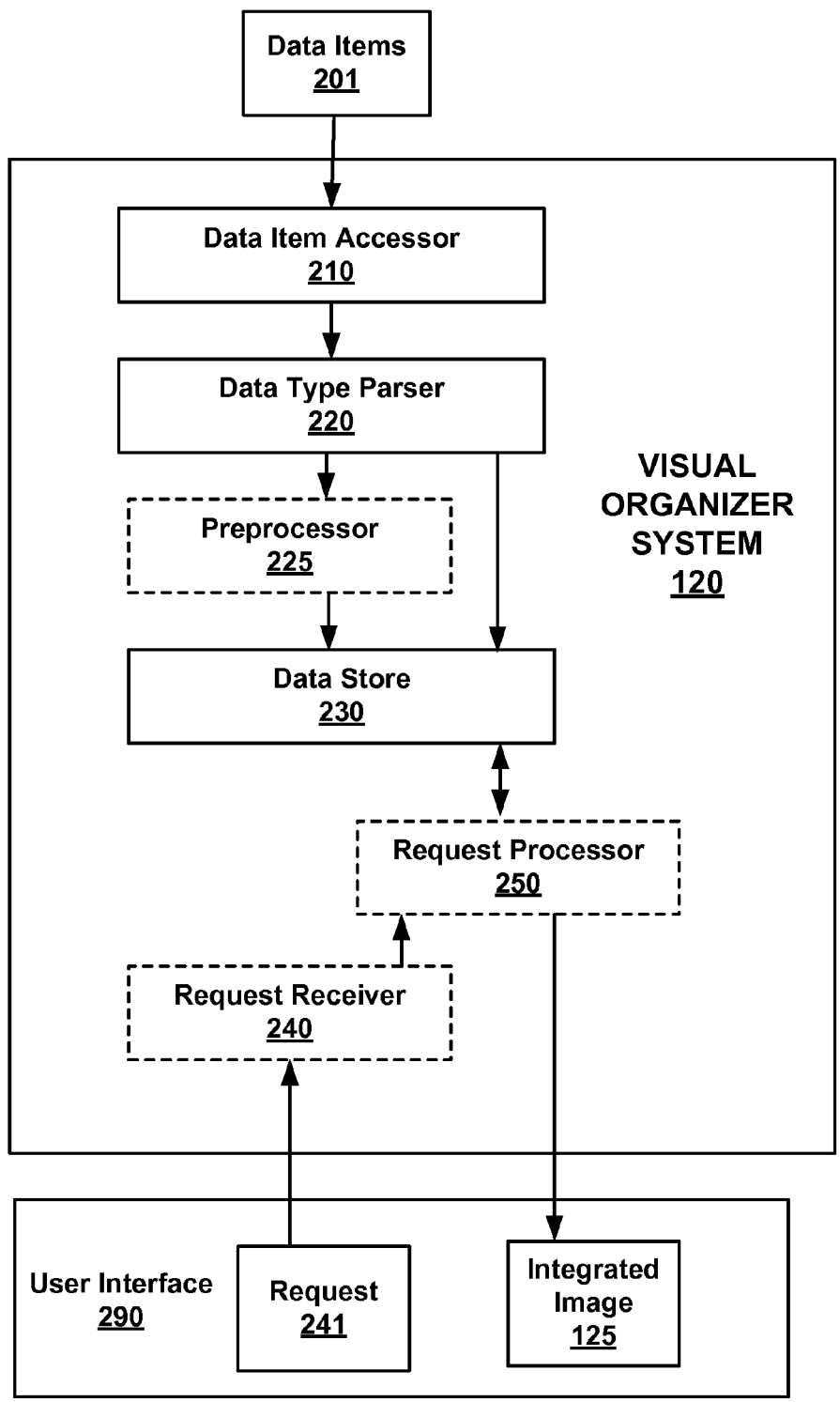
FIG. 2 is a block diagram of an example visual organizer system, in accordance with an embodiment.

FIG. 2 is a block diagram of an example visual organizer system 120 which organizes two or more of a plurality of diverse data items 201 that make up an accessible body of information associated with a particular situation. The diverse data items 201 are organized via geospatial data that is associated with individual data items of the diverse data items 201. Herein, visual organizer system 120 is interchangeably referred to as "information organizer system," and "system." In one embodiment, visual organizer system 120 includes one or more of data item accessor 210, data type "parser" 220, and data store 230. In some embodiments, visual organizer system 120 further includes one or more of preprocessor 225, request receiver 240, and request processor 250.

The components of visual organizer system 120 communicate with one another as required in the performance of organization of data items 201 which are received by system 120. The components of system 120 may be implemented in one or more of hardware, a combination of hardware and software, and a combination of hardware and firmware. Although depicted as a stand alone system, in some embodiments, system 120 may be implemented as a distributed system with some components located in differing locations. For example, in one embodiment, request processor 250 may comprise a plurality of render servers (among other components) that are coupled via a network.

In one embodiment, data item accessor 210 operates to access a plurality of diverse data items 201 related to a physical location. The accessing can comprise pushed and/or pulled data items 201. That is, data item accessor 210 may operate to pull (retrieve) a data item 201 or receive a pushed data item 201. The diverse data items 201 that are accessed include geospatial data associated with individual data items of the diverse data items 201. The geospatial data may be overtly included in content of a data item 201 or associated with the data item 201, such as in metadata of the data item 201. For example, a data item 201, such as a digital image file, may include geospatial data in the form of geocoded latitude and longitude in metadata of the image file. Similarly, in some embodiments, time of creation data (e.g., a date time group) may be included with an accessed data item 201. In one embodiment, the accessed diverse data items 201 are diverse due to including at least one non-visual data item (such as precipitation information or project schedule information) for a geographic location and at least one visual imagery data item (such as a digital image associated with the same physical location).

Figure 3:
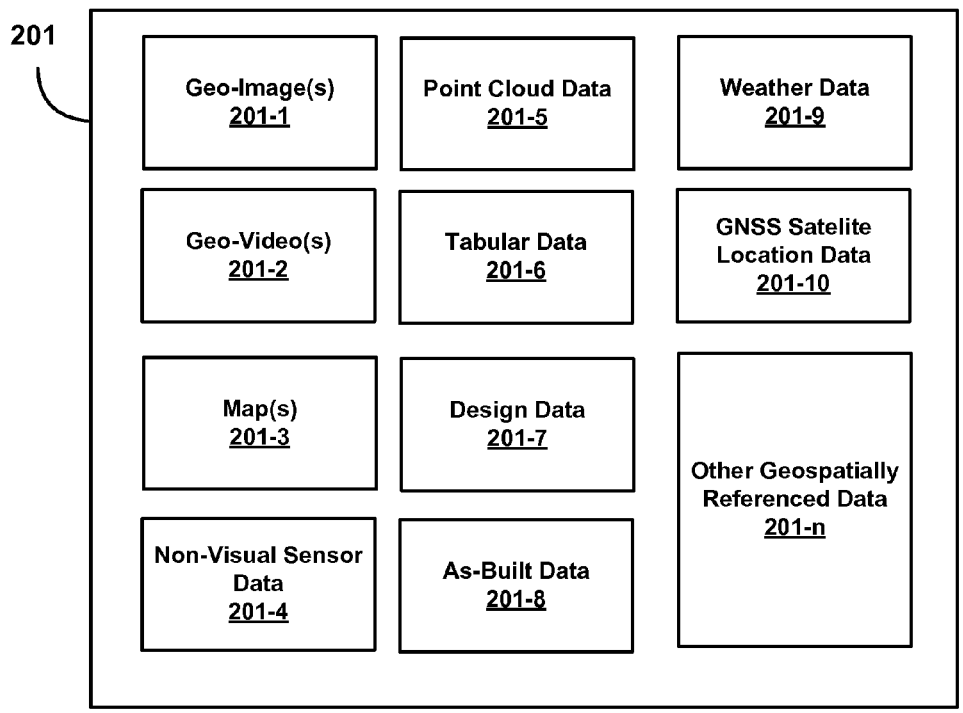
FIG. 3 is a block diagram illustrating a plurality of diverse data items, in accordance with one or more embodiments.

In one embodiment, data type parser 220 operates to parse any accessed diverse data items 201. Data items 201 are parsed by data type; such that the data type is identified so visual organizer system 120 can then preprocess data items 201 of a certain data type or associate a particular type of processing with data items 201 of a certain type. Some examples of data types include image data, sensor data, and tabular data. FIG. 3 illustrates some examples of data types, any or all of which may be accessed by system 120 in various embodiments.

In one embodiment, data store 230 operates for storing accessed diverse data items 201. Data store 230 may be a single storage device such as a single hard disk drive on a computer or a large storage system such as a storage area network or a plurality of file servers. The stored data items 201 in data store 230 have been parsed and some have been preprocessed. In one embodiment, data store 230 is coupled with or includes a database and associated database management system which assists in storage of data items 201, search of stored data items 201, and access of stored data items 201. Data store 230 operates so that data items 201 are accessible according to the geospatial data that is associated with stored data items 201. Thus, stored data items 201 associated with a particular geographic location or area can be accessed. In one embodiment, data store 230 and data items 201 stored therein are organized such that data items 201 in data store 230 are searchable by latitude and/or longitude or other geospatial information such as zip code. For example, searching using more significant digits of latitude and or longitude increases the specificity of a search, while searching with fewer significant digits and/or a range such as coordinates which define a geographic area can broaden a search.

In one embodiment, when included in system 120, preprocessor 225 operates to preprocess one or more diverse data items 201 based upon a determined data type for each diverse data item 201 that is preprocessed. In some embodiments, preprocessor 225 may be a module of request processor 250. A variety of preprocessing actions can be implemented. Such preprocessing actions include, but are not limited to: converting data items of a particular type into some common file format; locating geospatial content of a data item; stripping unneeded or unwanted content from a data item; dividing a data item into multiple data items; and determining a security access setting to be associated with the data item.

For example, in one embodiment, a data item 201 identified by data type parser 220 as being visual imagery data may be sent to preprocessor 225 so that it can be preprocessed into a common file format. That is, in one embodiment, if the visual imagery data is in the file format of a graphics interchange format or any other image format besides joint photographic experts group format, preprocessor 225 converts the visual imagery data into a joint photographic experts group format prior to storing the data item 201 in data store 230. In such an embodiment, all accessed visual imagery data items can thus be stored in a common file format, which may simplify and/or expedite any follow on processing that may be requested or required with respect to the data items 201 of this data type. Even in an embodiment where preprocessing is not performed, the parsing by data type allows identification of a processing technique to utilize with the data item 201. Like types of data items 201, such as image files, may be stored in an in-common portion of data store 230, such as on a file server dedicated to storage of image files. The like data items 201 stored in such a fashion can then be further categorized by their associated geospatial data such that they may be retrieved or accessed based upon the geographic location with which they are associated.

In one embodiment, when included in system 120, request receiver 240 receives a request 241 regarding a physical location. Request 241 is a query for data associated with the physical location which may be a geographic point or area. Request 241, in one embodiment, is received from a user and is sent by means of a utility or user interface 290 which may be a web viewer, a browser, or an application run in a web browser, or some other application resident upon an electronic device. In one embodiment, a portion of request receiver 240 is an interface that is presented in the form of a browsable web page which a user may access via user interface 290. The user initiating a request 241 can initiate the request from inside or outside (as depicted) of visual organizer system 120, depending on where user interface 290 is located.

An externally initiated request 241 is, in one embodiment, received via a network connection coupled with request receiver 240. In addition to specifying a physical location, request 241 may specify other information, such as a time or range of times that are also associated with the physical location. A request 241 may also specify a particular piece of equipment associated with the physical location or specifically request particular types of data (e.g., precipitation data for a particular time range). Request 241 may also specify the file format for delivering the response or sizing requirements that are to be applied to the response. For example, if request 241 is sent from a hand held device or from a device that lacks broadband communication a lower resolution and/or smaller file size may be specified for any response to request 241.

In one embodiment, when included in system 120, request processor 250 acts upon received requests and processes diverse data items 201 related the physical location that is specified in the request. This comprises accessing data store 230 to retrieve a plurality of data items 201 related to the specified physical location. Request processor 250 then integrates at least two of the data items 201 together to produce an integrated image 125 that is displayable via a web viewer. The integration can take the form of creating image tiles from each of the data items 201 and then overlaying them to produce a single integrated image 125 which can then be converted to a single file in a format (e.g., a joint photographic experts group file format) that is displayable via a web viewer. In some embodiments, an integrated image 125 may comprise a video image. In one embodiment, request processor 250 may comprise one or more render servers which render a variety of data types into image formats. Particular render servers may be dedicated to processing data items 201 of particular data types. In response to a specification by a request 241, request processor 250 may process an integrated image 125 such that it is of a certain file size or resolution and/or such that it includes integration of particular data items 201 that were specified by the request 241. In one embodiment, as depicted, integrated image 125 may be provided to or for access by the same user interface 290 that supplied the particular request 241 that initiated creation of an integrated image 125. In other embodiments, system 120 may store an integrated image 125 and/or provide the integrated image 125 to or for another entity besides the original requesting entity.

Non-Limiting Examples of Data Items

FIG. 3 is a block diagram illustrating a plurality of diverse data items 201, in accordance with one or more embodiments. In one embodiment, all data items 201 include or are associated with geospatial data. The data items 201 that may be accessed by data item accessor 210 include, but are not limited to: geo-image(s) 201-1, geo-video(s) 201-2, map(s) 201-3, non-visual sensor data 201-4, point cloud data 201-5, tabular data 201-6, design data 201-7, as-built data 201-8, weather data 201-9, GNSS satellite location data 201-10, and other geospatially referenced data 201-n.

A geo-image 201-1 may include a digital image file which is geocoded or otherwise geospatially referenced. Some example file formats for geo-images 201-1 include: a JPEG file, a Geo-referenced JPEG (GeoJPEG) file, a Geo-referenced Tagged Image Format File (GeoTIFF), among others. A geo-image 201-1, in some embodiments, is an image file that has been captured and embedded (such as in a header of the digital file or other metadata of the digital file) with GNSS information. For example, many modern digital image capture devices include GPS receivers which geo-tag captured images with coordinates of the digital image capture device at the time of capture of the images. Such image files may also be time-tagged with a time of capture. A geo-image 201-1 also includes any digital image file that is geospatially referenced/annotated or otherwise geo-tagged. For example, a person may utilize an image scanner to scan a photograph and created a digital image file. The person may then associate a geographic location with the digital image file of the photograph, and thus created a geo-image 201-1. Likewise, an existing digital image file may be geocoded at some point after its capture to create a geo-image 201-1. Geo-video(s) 201-2 may similarly be geocoded or geospatially referenced at a time of capture or post-capture. Additionally, geo-images 201-1 and videos 201-2 may also be associated with a time (e.g., a time of creation or capture).

Maps 201-3 may be geocoded and/or geospatially referenced in many instances as an inherent nature of being a maps. Additionally, a map image may be geospatially referenced indirectly, for example a highly zoomed image may include metadata which describes the geographic location depicted by the map image.

Non-visual sensor data 201-4 includes data from non-visual sensors such as position, sound, light, wind, and precipitation sensors, among others. For example, non-visual sensor data 201-4 can include position data from a survey device or from a GNSS receiver embedded in an electronic device such as a digital camera. In another example, data from a weather station at a particular geographic location may provide non-visual sensor data 201-4; this data may be in the form of a digital file. A digital audio recording which is geospatially referenced to a geographic location is yet another example of non-visual sensor data 201-4. In addition to being associated with a physical location, non-visual sensor data 201-4 may also be associated with a time (e.g., a time of capture).

Some other types of data items that are described herein, such as point cloud data 201-5, tabular data 201-6, GNSS satellite location data 201-10, and sometimes weather data 201-9 and even as-built data 201-8 may generally or occasionally take the form of non-visual data (i.e., they not image based). In some instances these other types of data, may also overlap into the category of non-visual sensor data 201-4.

Point cloud data 201-5 data can be generated by digital scanners, geographic information system devices, and the like and typically provides a set of vertices in a three-dimensional coordinate information system (e.g., latitude, longitude, and elevation). Point cloud data 201-5 may be raw data or may be associated with a digital elevation model of an object of interest such as a structure, physical object, or physical location. Point cloud data 201-5 representing an as-built configuration can provide as-built measurements and tolerances of a structure or project. Point cloud data 201-5 may be either inherently geospatial or have an associated geospatial data component and may also have a time component, such as a time of capture.

Tabular data 201-6 can include journal type entries (e.g., words, numbers, and/or other alphanumeric characters) in the form of a digital file. Word processor documents, spread sheets, and project management timelines are some examples of tabular data. As used herein, tabular data includes geospatial data within the tabular data or associated with the digital file. In addition to being associated with a physical location, tabular data 201-6 may also be associated with a time. The time associated may be a time of creation or modification of the data file of the tabular data or a time/date included in the content of the tabular data.

Design data 201-7 includes as-designed measurements and tolerances of an object of interest, such as a structure or project. In addition to being associated with a physical location, design data 201-7 may also be associated with a time (e.g., a date time group) as design data may be modified or changed over time. Design data 201-7 can overlap other categories and may include figures, drawings, images, and tabular data which describe an as-built configuration. Design data 201-7 may be either inherently geospatial or have an associated geospatial data component.

As-built data 201-8 includes as-built measurements and tolerances of an in-process or completed object of interest such as a structure or project. In addition to being associated with a physical location, as-built data 201-8 may also be associated with a time (e.g., a date time group) as as-built data may be modified or changed over time. As-built data 201-8 data can overlap other categories and may include figures, drawings, images, and tabular data which describe an as-built configuration. As-built data 201-8 may be either inherently geospatial or have an associated geospatial data component.

Weather data 201-9 can include data such as wind, temperature, humidity, dew point, precipitation, and other weather data that is recorded or forecast for a geographic location. Such weather data may be collected by an on-site weather station or come from some other source such as a weather web site. Weather data 201-9 may be geospatially referenced in a variety of manners, such as for specific geographic coordinates or for a region such as a zip code or a town. In addition to being associated with a physical location, weather data 201-9 may also be associated with a time (e.g., a date time group, range of times, day of the month, etc.).

GNSS satellite location data 201-10 may include the relative positions of one or more GNSS satellites as viewed from a particular geographic location at a particular time. For example, GNSS satellite location data 201-10 may be determined by many well known services or means (e.g., satellite orbit simulators or propagators). Such data represents or illustrates the position in the sky where one or more GNSS satellites would appear when viewing from a geographic location at a particular time. In addition to being associated with a physical location, GNSS satellite location data 201-10 may also be associated with a time (e.g., a date time group).

Other geospatially referenced data 201-$n$ includes other, undescribed categories and types of data and/or digital files which are either inherently geospatial or have an associated geospatial data component which links the other data 201-$n$ to a geographic location.

FIGS. 4A-4K illustrate several individual examples of diverse data items 201 which may be accessed regarding a geographic location, in accordance with one or more embodiments.

Figure 4A:
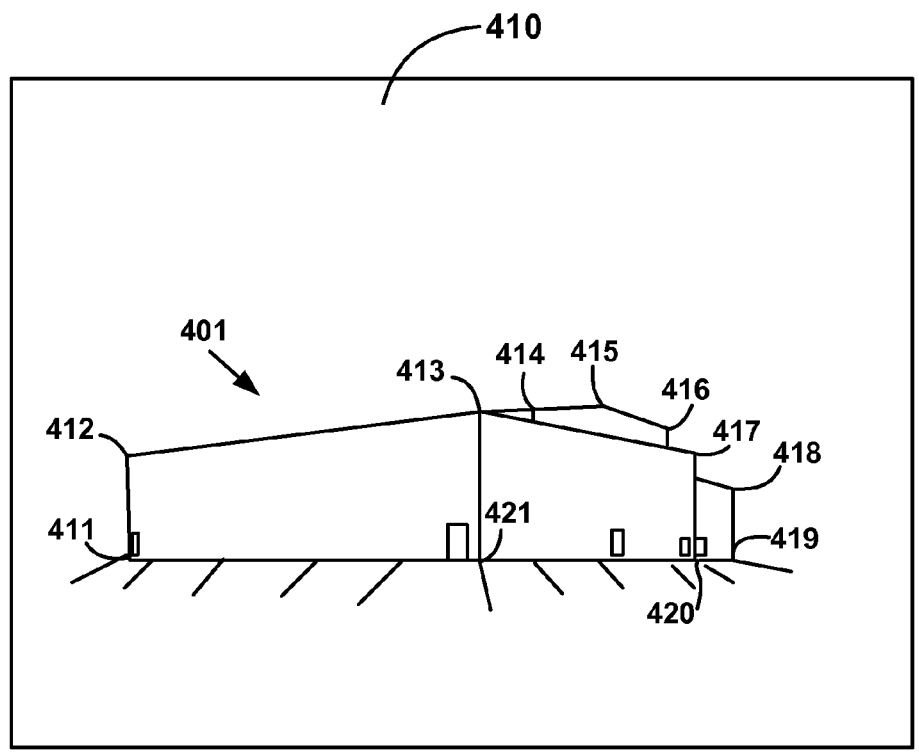
Figure 4B:
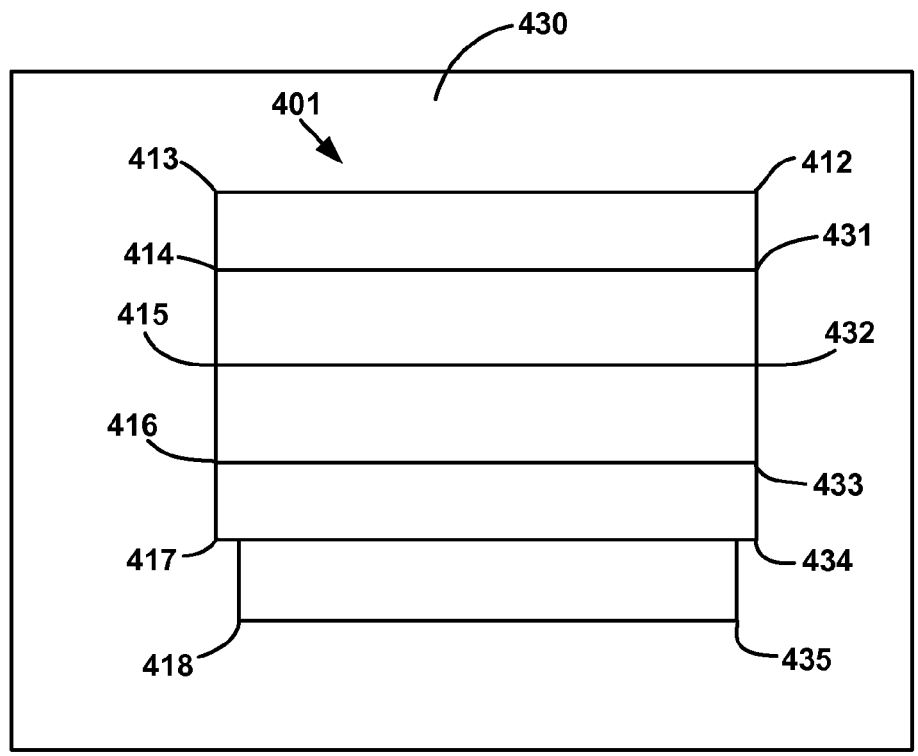

FIGS. 4A and 4B illustrate visual representations of as-designed drawings 410, 420 (e.g., CAD drawings) of a tilt-up building 401. FIG. 4A is a Northwest elevation of tilt-up building 401 in which various points such as points 411-421 are georeferenced with latitude, longitude, and elevation. FIG. 4B is a plan view of tilt-up building 401 in which various points such as points 412-418 and 431-435 are georeferenced with latitude, longitude, and elevation. In one embodiment, a similar visual representation to drawing data item 410 can be rendered from point cloud data which is scanned from building 401. Such a drawing rendered from point cloud data would represent an as-built state of building 401 at a particular time.

Figure 4C:
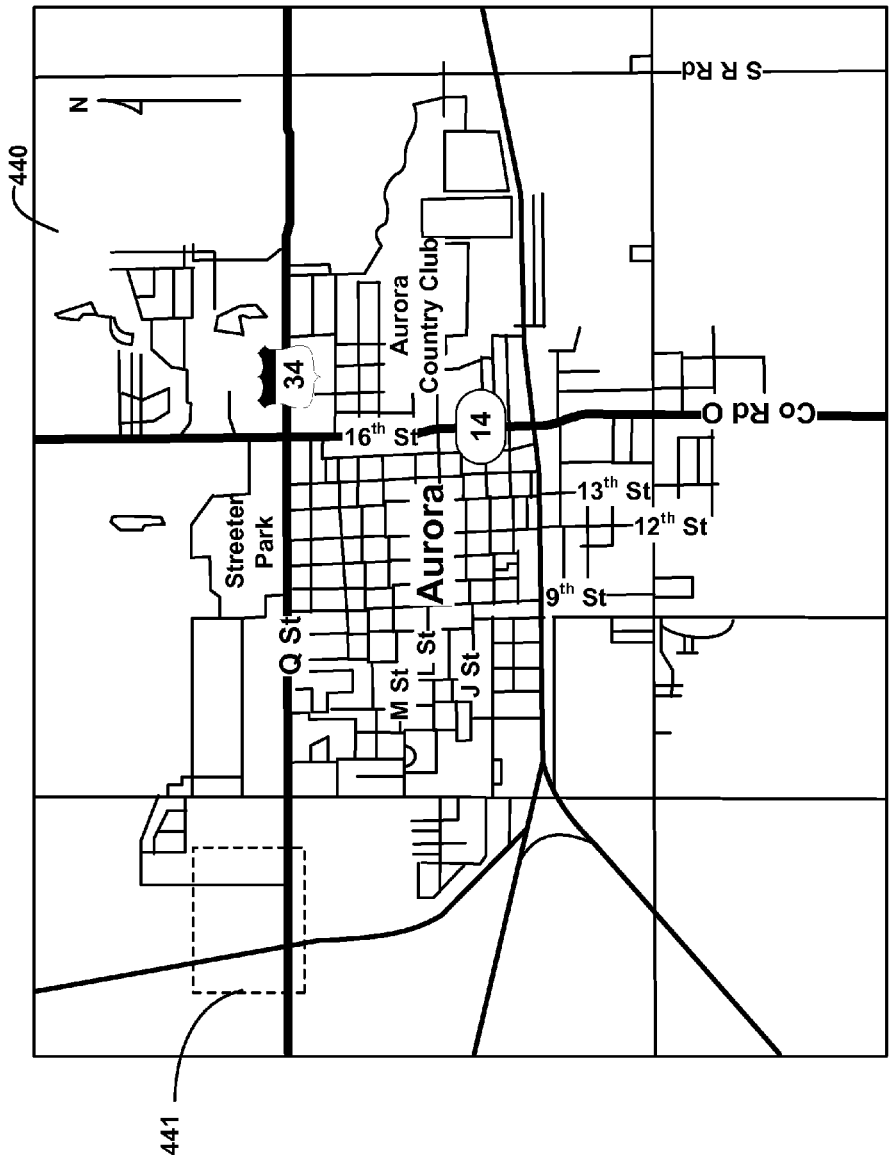

FIG. 4C is a map 440 of the city of Aurora, Nebr. Region 441 of map 440 denotes an area in which tilt-up building 401 is planned to be built. It is appreciated that a satellite image could similarly represent the town of Aurora, Nebr. if it were suitably geospatially referenced (e.g., with marked streets and/or geographic coordinates).

Figure 4D:
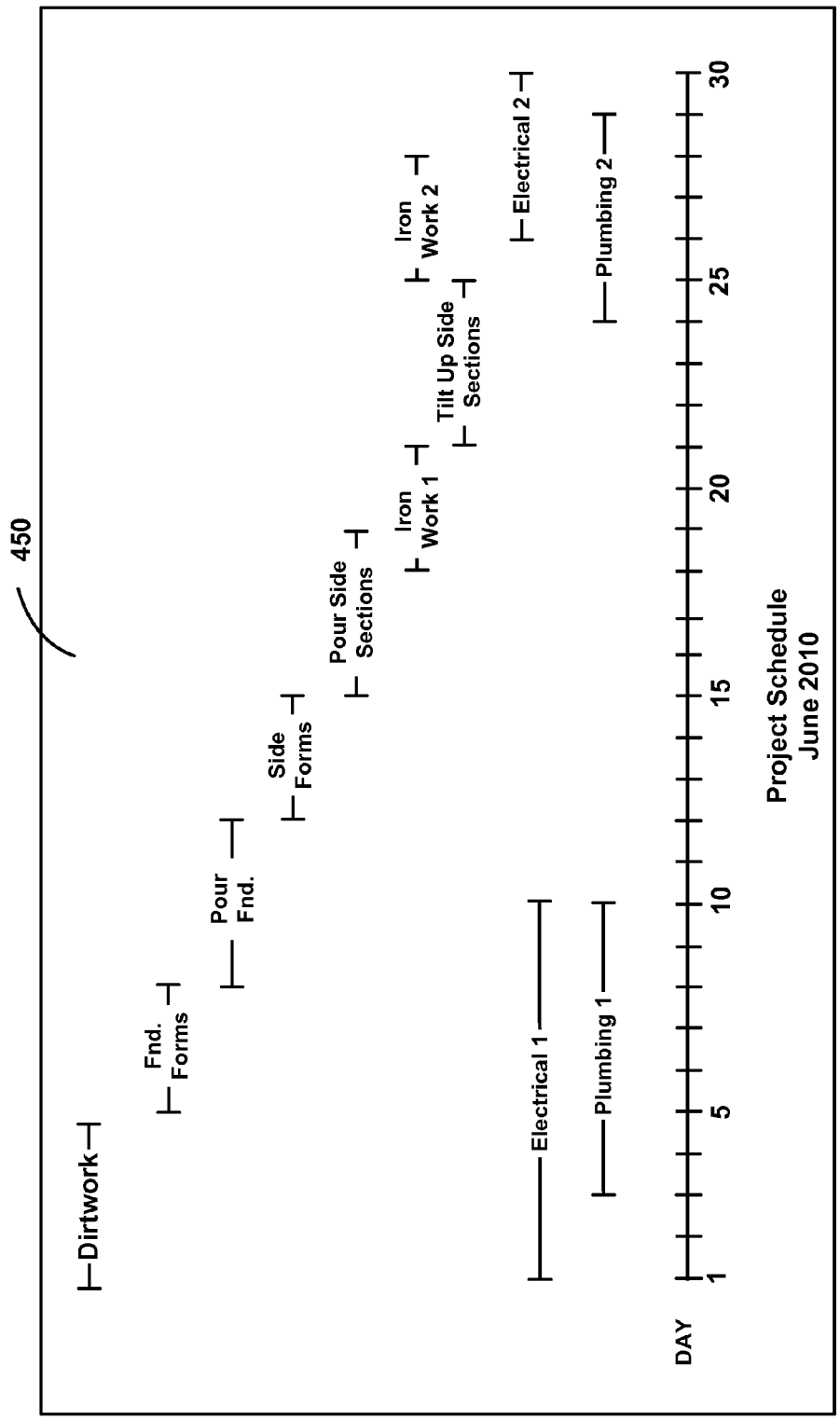

FIG. 4D illustrates example displayed content a project schedule 450 for construction of tilt-up building 401. Project schedule 450 may be inherently geospatial (e.g., if coordinate or geographic information is overtly listed within the user content of the file) or have an associated geospatial data component which links the project schedule 450 to a geographic location. In one embodiment, associated geospatial data may be input by a user and saved as part of the metadata of the digital file of project schedule 450.

FIG. 4E illustrates example displayed content of a weather data file 460 for the region of Aurora, Nebr. as specified by the zip code 68818. Data of weather data file 460 is an example of tabular data 201-6 and includes precipitation and average temperature recorded on dates in June, 2010. In one embodiment, weather data file 460 is a spreadsheet file. Weather data file 460 may represent an archive file from a weather station or information accessed from a weather service.

FIG. 4F illustrates displayed textual content of a site supervisor's site notebook entry 465 for Jun. 10, 2010. This is another example of tabular data 201-6. The content of the entry is geospatially referenced by including a geographic coordinate latitude and longitude in content of the notebook entry. In one embodiment, supervisor's site notebook entry 465 is a word processor file or other digital text file, a combination of text and images in a file, a weblog ("blog"), or the like.

Figure 4G:
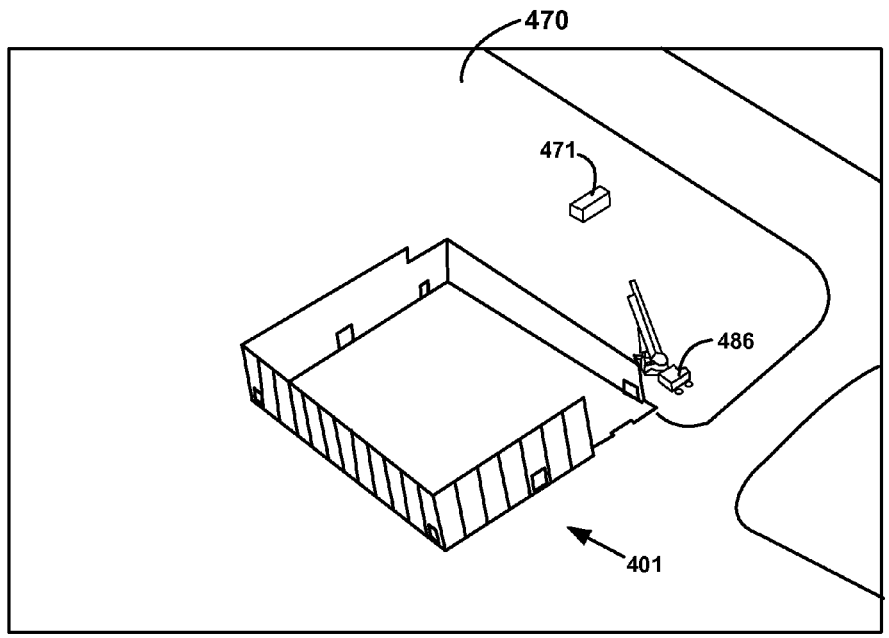

FIG. 4G is a digital image 470 which illustrates a northwest aerial perspective of an as built condition of tilt-up building 401. An image such as image 470 may be captured from an aerial platform such as an aircraft or a crane. In one embodiment, image 470 includes metadata which defines a location of capture of image 470 (e.g., latitude, longitude, and elevation). For example, such metadata may indicate that image 470 was captured at 40.9832N, 98.020W, and at 2900 feet elevation above sea level. Such metadata may also include other information such as a date time group associated with the time of capture of image 470 and/or a compass heading relative to the orientation of an image capture device at the time of capture of image 470. For example, image 470 may include a date time group (DTG) of 20100622/1504UTC which indicates that image 470 was captured on Jun. 22, 2010 at 15:04 (3:04 PM) coordinated universal time and metadata that indicates a Southeastern orientation of the image sensor of the digital image capture device. In addition to tilt-up building 401, numerous items of construction equipment, vehicles, containers, and construction materials are depicted. For example, crane 486 and shipping container 471 are visible.

Figure 4H:
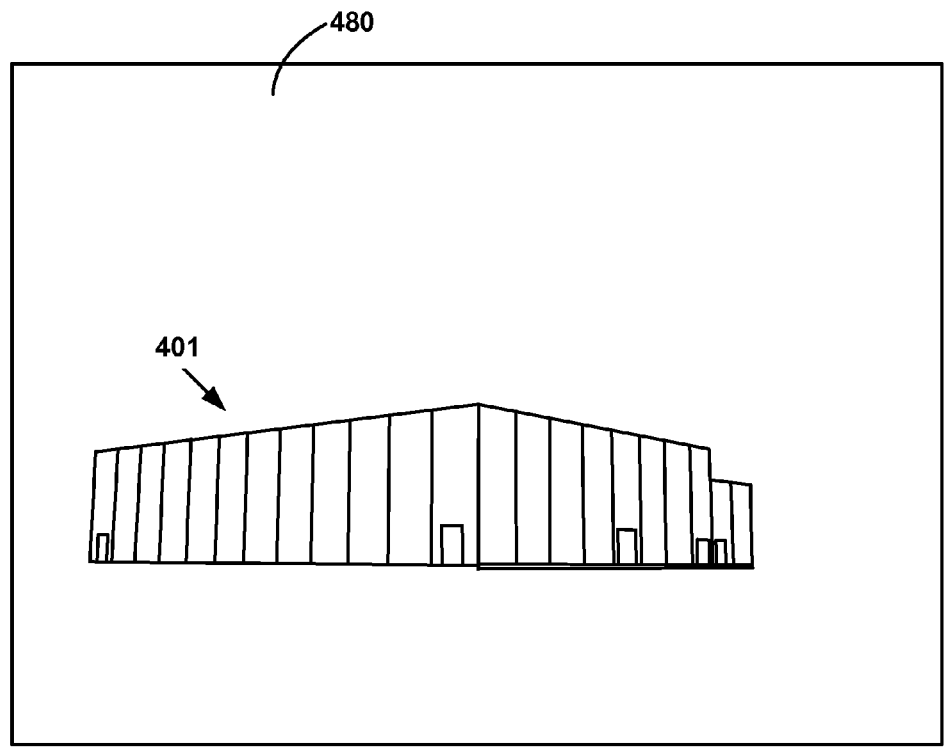

FIG. 4H is a digital image 480 which illustrates a northwest perspective of an as built condition of tilt-up building 401. In one embodiment, image 480 includes metadata which defines a location of capture of image 470 (e.g., latitude, longitude, and in some instances elevation as well). Such metadata may also include other information such as a date time group associated with the time of capture of image 470 and/or a compass heading relative to the orientation of a digital image capture device at the time of capture of image 470. For example, image 470 may include a date time group (DTG) of 20100622/1504UTC which indicates that image 470 was captured on Jun. 22, 2010 at 15:04 (3:04 PM) coordinated universal time and a Southeastern orientation of the image sensor of the digital image capture device. In addition to tilt-up building 401, items of construction equipment and a construction vehicle are visible. In one embodiment, an image such as image 480 is captured by a digital image capture device coupled with a surveying instrument.

FIG. 4I illustrates example displayed content of a crane operation log 485 that is associated with a crane 486 that is operating at the build site of tilt-up building 401. Crane 486 is used, in one embodiment, to lift tilt-up sections of building 401 into place. Operation log 485 shows times and locations of various crane operations such as lifts and movements. Operation log 485 tracks operations on a once per minute basis as reported by a reporting device coupled with crane 486. It is appreciated that other equipment including construction equipment (e.g., construction equipment such as dozers, backhoes, cranes, graders, dump trucks, air compressors and the like) may also include attached reporting devices which create similar operation or tracking logs. Operation log 485 logs events on a minute by minute basis, however more or less frequent reporting and logging of events may occur.

FIG. 4J illustrates example displayed content of a container tracking data log 490 that is associated with shipping container 471. Data log 490 includes information reported from a remote tracking device, such as a GNSS positioning device, that is coupled with container 471 and reports a position at some time interval (e.g., hourly, daily, in response to sensed movement, etc.) via a wireless transmission. In some embodiments, other data in addition to position data may be reported. In one embodiment, shipping container 471 is used to house and ship concrete forms used for framing portions of the foundation of tilt-up building 401. The data represented in data log 490 tracks the position (latitude and longitude) of container 471 on a day-by-day basis throughout the month of June 2010. As is illustrated, container 471 arrived at geographic coordinates similar to those of building 401 on Jun. 10, 2010. It is appreciated that similar data logs may exist for logging data, including positioning data, that is associated with other items such as construction equipment and construction materials utilized in the construction of tilt-up building 401.

Figure 4K:
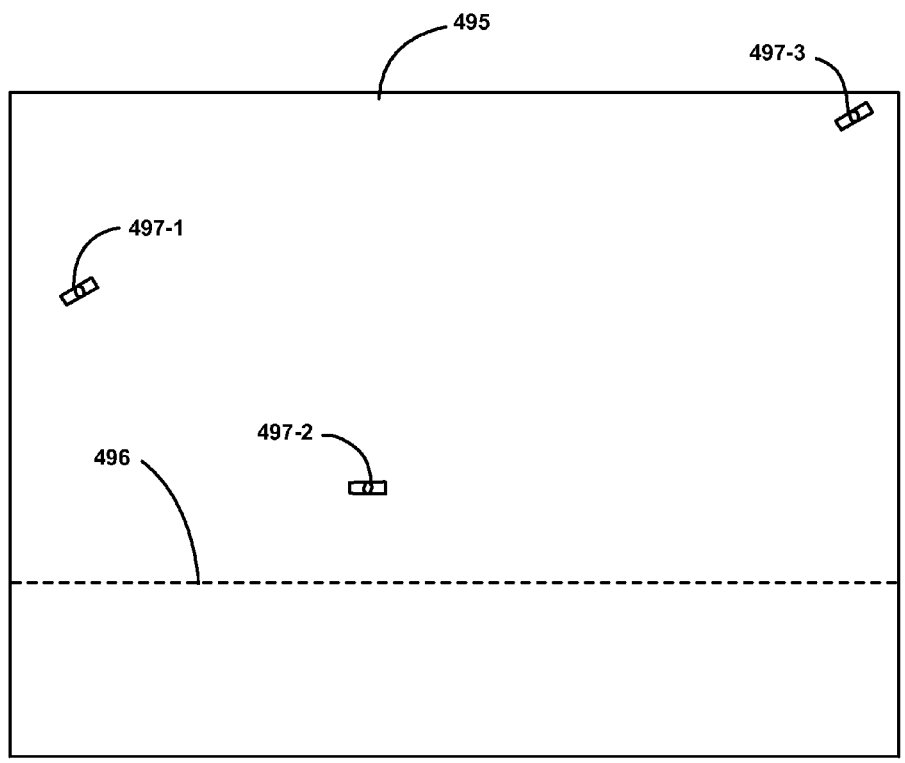

FIG. 4K illustrates a generated image 495 which approximates positions of GPS satellites 497 in the field of view encompassed by image 480 at the location and time and capture of image 480. It is appreciated that satellite location data (e.g., data item 201-10) for such an image can be generated with utilities such as satellite orbit generators and projectors. Generated image 495 can be further refined based upon a compass heading of the image capture device at the time of capture of image 480 and based upon information regarding the field of view (e.g., focal length in millimeters) at time of capture of image 480. Such heading and field of view information is or maybe recorded in metadata of image 480, or may be supplied after-the-fact. In generated image 495, three GPS satellites 497-1, 497-2, and 497-3 are illustrated as being in the field of view and above horizon line 496.

Example Result of Preprocessing

Figure 5A:
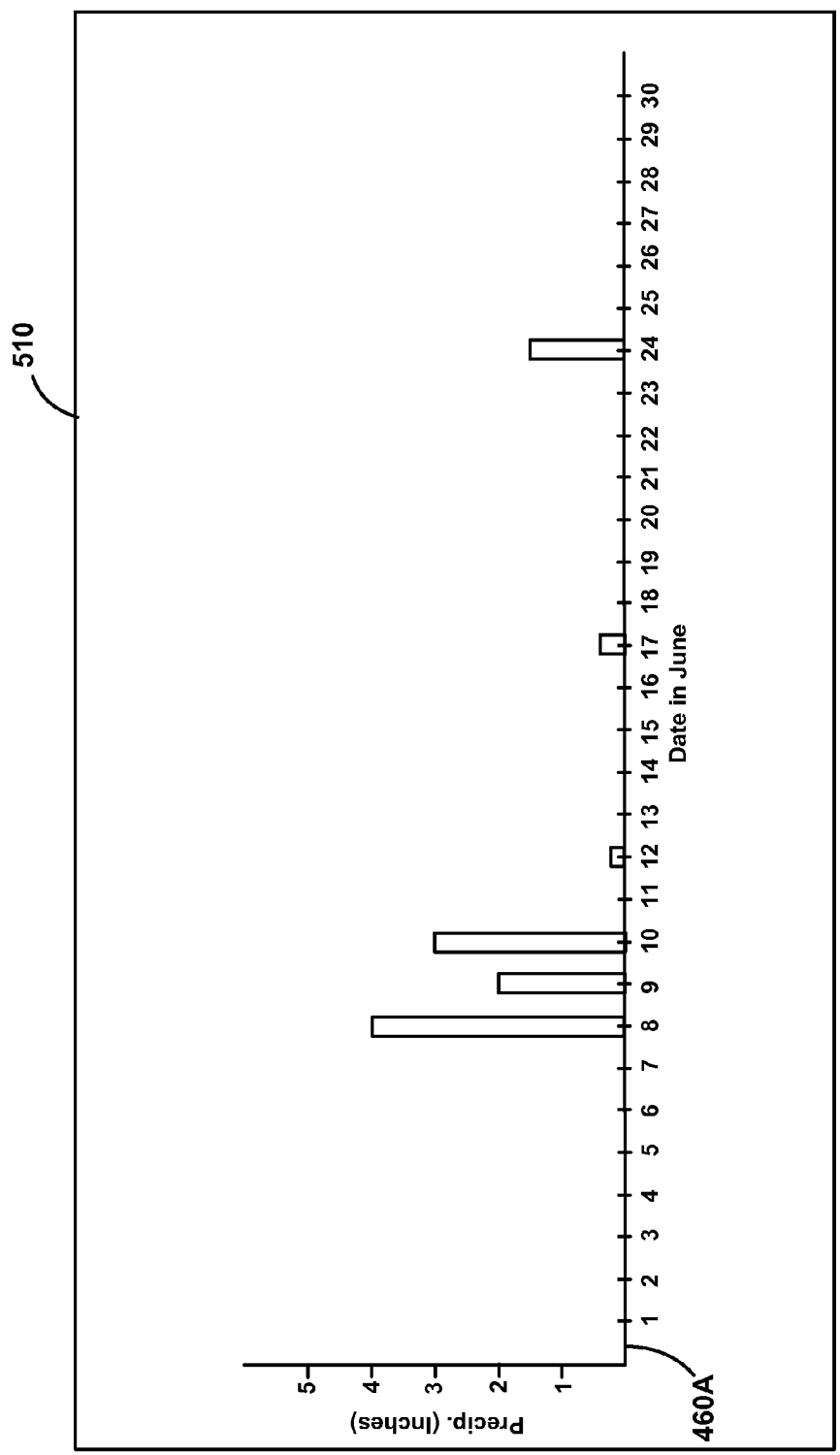
FIGS. 5A and 5B illustrate some example results of pre-processing of one or more diverse data item that are associated with a physical location, in accordance with various embodiments.

FIG. 5A illustrates an image 510 of an example result of preprocessing of a data item 201 that is associated with a physical location, in accordance with one or more embodiments. Preprocessed image 510 is one example of preprocessing which may be performed by preprocessor 225. As illustrated in preprocessed image 510, the data of weather data file 460 has been reformatted from a spreadsheet type form at to a more visual, histogram type form 460A. In one embodiment, preprocessed image 510 is formatted into an image file such as a JPEG file GeoJPEG file (which may comprise more than one actual file) which can be overlaid like a scalable tile upon another image from another image file. It is appreciated that request processor 250 may generate a similar image to that of image 510. However, preprocessing a data item 201, when possible or practical, can reduce the time required during processing of some requests 241 by request processor 250.

Figure 5B:
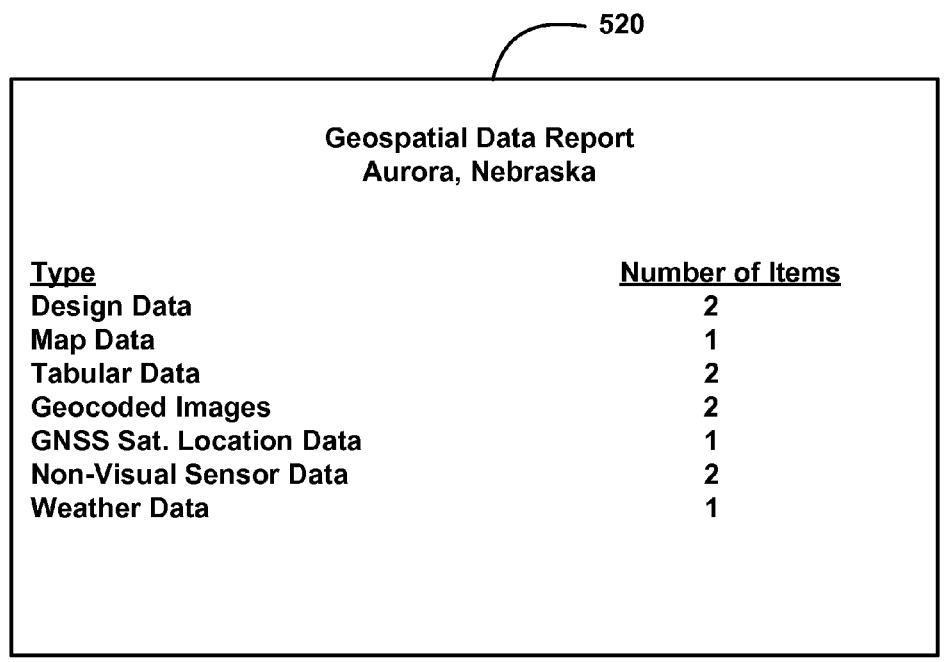

FIG. 5B illustrates an example result of preprocessing a plurality of diverse data items 201 to create a report 520 listing diverse data items 201 associated with a physical location, in accordance with an embodiment. FIG. 5B shows a display of the content of a report 520 that lists geospatial data item content available for the physical location of the town of Aurora, Nebr. (which may be defined by geographic coordinates, zip code, or some other manner). All of the data items 201 of FIGS. 4A-4K are listed in report 520. Report 520 breaks down the geospatial data by "Type" and "Number of Items," however other report formats may be utilized. In one embodiment, when a report of geocoded data items 201 is requested, all data items 201 in geocoded file formats are listed in a report. Some non-inclusive examples of geocoded file formats include: DXF (drawing interchange format or drawing exchange format used by computer aided design software), DWG (another drawing format used by computer aided design software), KML (keyhole markup language, an XML-based language schema for expressing geographic annotation and visualization on existing or future Internet-based, two-dimensional maps and three-dimensional Earth browsers), GeoTIFF, and GeoJPEG. Additionally, some JPEG files may include geographic coordinates in a field of their metadata. It is appreciated that request processor 250 may generate a report to that of report 520.

Numerous other types of preprocessing of data items 201 can be accomplished in various embodiments. As such, preprocessed image 510 and report 520 represent only two possible results of such preprocessing. Preprocessing can also involve preprocessor 225 combining a plurality of the accessed diverse data items 201 of differing data types into a into a single digital file much in the same way that request processor 250 creates an integrated image 125. For example, with reference to FIG. 6A, in one embodiment, preprocessor 225 may have already combined data items 480 and 495 into a single digital file (e.g., a JPEG file GeoJPEG file or other image file), leaving request processor 250 only to further integrate data item 410.

Example Integrated Images

FIGS. 6A-6G illustrate several non-limiting examples of integrated images 125 which may be generated by a visual organizer system 120, in accordance with one or more embodiments. It is appreciated that the combination of data items 201 which are integrated in a particular integrated image 125 is based, at least in part, upon the nature of the request 241 and the data items 201 related to the physical location specified in the request which are available in data store 230. As such, other permutations of integrated images 125, beyond those that are illustrated in FIGS. 6A-6G, are possible based upon the example data items illustrated in FIGS. 4A-4K.

Figure 6A:
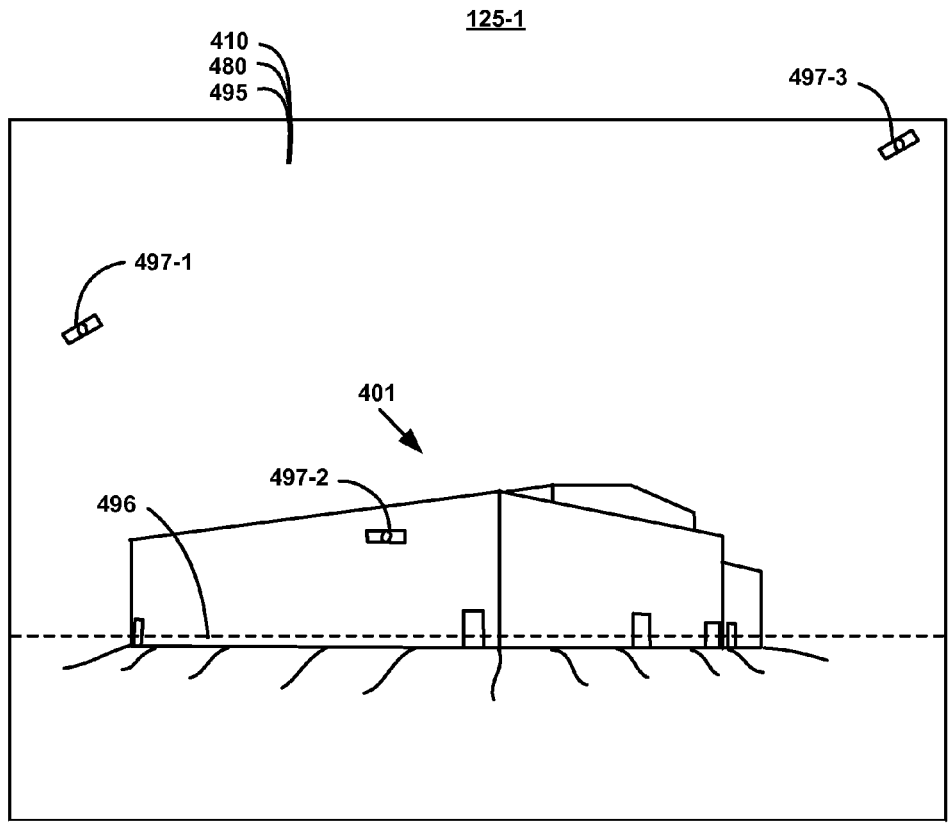
FIGS. 6A-6G illustrate several examples of integrated images which may be generated by a visual organizer system, in accordance with various embodiments.

FIG. 6A illustrates integrated image 125-1, which integrates design data, as-built data, and GPS satellite location data. According to one embodiment, in response to a request 241 regarding the physical location of tilt-up building 401 (e.g., a request regarding status as of June 23), request processor 250 accesses data items 410, 480, and 495 from data store 230 and integrates them. For example, request processor 250 adjusts the opacity of data items 410 and/or 480 so that the content may be overlapped with out obscuring visible content. Additionally, request processor 250 utilizes one or more techniques such as features matching and matching of embedded coordinates to accurately align features in the diverse data items which are integrated. These actions may be accomplished, in one embodiment, by render servers of request processor 250. Thus, horizon line 496 of data item 495 is aligned with an approximate horizon line from data item 480 and points of tilt-up building 401 are aligned between data item 410 and data item 480. The integration of diverse data items 410, 480, and 495 thus results in the displayed content of integrated image 125-1. After alignment of component data items (410, 480, and 495), request processor 250 renders the data items being integrated into a single digital image file (e.g., a JPEG file, GeoJPEG file, or other image file) which is displayable via a web viewer.

Integrated image 125-1 illustrates the progress of tilt-up building 401 by allowing an overlapped visual contrast between design and as-built states. Integrated image 125-1 also illustrates, that, for surveying purposes at the time of capture of image 480, positioning data from satellites 497-1 and 497-3 was unobstructed, but positioning data from satellite 497-2 was likely shadowed or obscured due to satellite 497-2 being "behind" tilt-up building 401 at the time of capture of data item 480 and/or any surveying which took place at the same location/time. Such knowledge allows the data from satellite 497-2 to be removed from calculations during post-processing of survey results or other geo-location results.

Figure 6B:
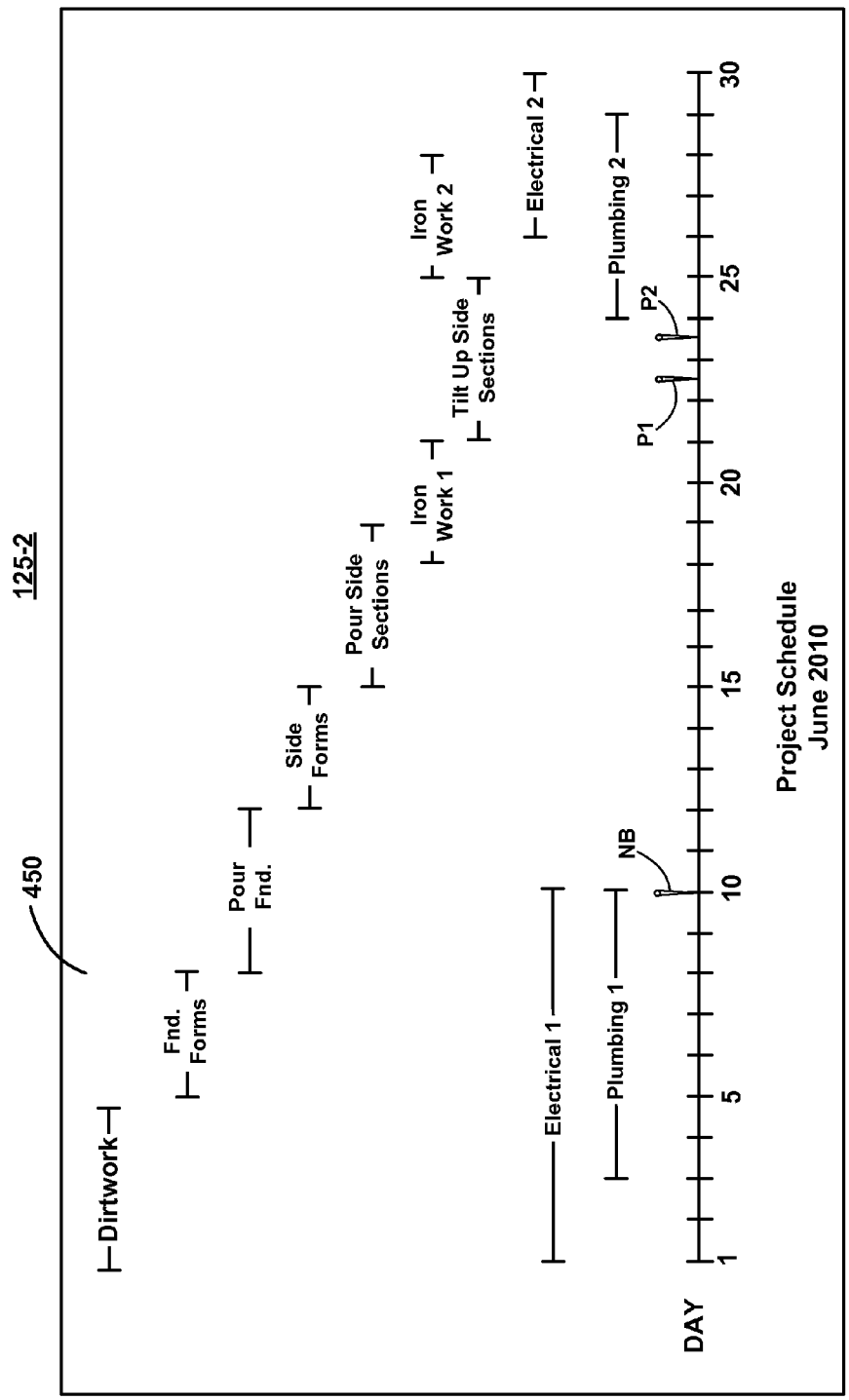

FIG. 6B illustrates integrated image 125-2, which integrates a project schedule along with links to various data items. As illustrated in FIG. 6B, integrated image 125-2 is very similar to data item 450, a project schedule. However, integrated along the DAY timeline are link indicators "NB," "P1," and "P2," which link to data items associated with particular dates. As depicted, the link indicators are in the shape of pushpins, however additional or alternative shapes or designs for link indicators can be utilized. Certain link indicators may be associated with certain types of data items (the type being determined by parsing). For example, a star may represent a link tracking data, a push pin may represent a linked image, and book may represent a link to text. A variety of prepackaged link indicators and/or user selectable link indicators may be utilized in this or fashion to annotate an integrated image in regards to geospatial information or links thereto.

Integrated image 125-2 succinctly shows a project schedule for the month of June, 2010 and illustrates other available data item that are associated with the physical location specified in by the request 241 which caused generation of integrated image 125-2. The other available data items are presented in a manner that visually represents time information associated with the other data items. According to one embodiment, in response to a request 241 regarding the schedule and based upon the physical location for tilt-up building 401, request processor 250 accesses data items 450, 465, 470, and 480 from data store 230 and integrates them. For example, request processor 250 overlays link indicator NB at June 10th along the date line of the schedule to correspond with the Jun. 10, 2010 metadata of data item 465; request processor 250 overlays link indicator P1 to correspond with the date time group associated with data item 470; and request processor 250 overlays link indicator P2 to correspond with the date time group associated with data item 480. After overlay of link items NB, P1, and P2 request processor 250 renders the data items being integrated into a single digital image file (e.g., a JPEG file, GeoJPEG file, or other image file). The single digital image file is displayable via a web viewer and enables hyperlinks or other links to allow a user to select a link indicator (NB, P1, P2, etc.) to cause a data item that is associated with the selected link indicator to be displayed in a web viewer.

Figure 6C:
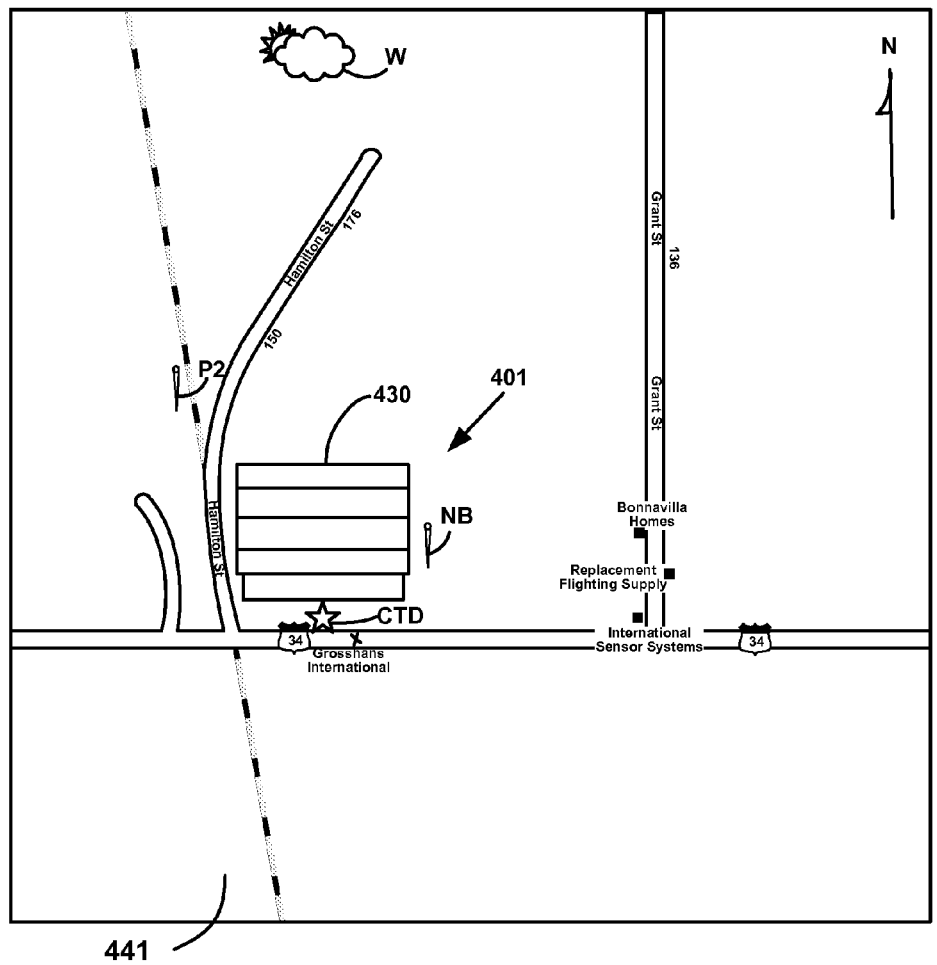

FIG. 6C illustrates integrated image 125-3, which integrates a map along with a visual depiction of one data item and links to various other data items. As illustrated in FIG. 6C, integrated image 125-3 is a zoomed in depiction of region 441 of data item 440, a map of the physical location of tilt-up building 401. Overlaid on map region 441 is a scaled version of design plan view data item 430 and link indicators "NB," "P2," "W," and CTD", which link to data items that associated with the particular physical location of map region 441. As depicted, link indicators NB and P2 are in the shape of pushpins, link indicator W is in the shape of a sun and cloud, and link indicator CTD is in the shape of a star. Link indicators NB and P2 have been previously described. Link indicator CTD represents the availability of container tracking data 490 for container 471, which may be linked to by selection of selectable link CTD. Link indicator W represents the availability of weather data 460 for the physical location, which may be linked to by selection of selectable link W. As discussed previously herein, additional or alternative shapes or designs for link indicators can be utilized.

Integrated image 125-3 succinctly shows a map of the physical location at which tilt-up building 401 is being built. Simultaneously integrated image 125-3 also illustrates three other available data items (via link indicators) that are associated with the physical location specified in by the request 241 which caused generation of integrated image 125-2. According to one embodiment, the request 241 which causes generation of integrated image 125-3 is a user input to zoom in on the region of region 441 of a map 440 that is displayed in a user interface 290. In response to the request 241 regarding map region 441, request processor 250 accesses data items 450, 465, 470, and 480 from data store 230 and integrates them. For example, request processor 250 accesses and then positions data item 420; request processor 250 overlays link indicator NB at a physical location of map region 441 which to correspond with the physical location metadata of data item 465 (site supervisor's notebook entry); request processor 250 overlays link indicator P2 to correspond with the physical location metadata of data item 480 (Northwest as-built perspective image); and request processor 250 overlays link indicator CTD to correspond with physical location metadata of data item 490 (Container Tracking Data). After overlay of data item 430 and link items NB, P2, and CTD, request processor 250 renders the data items being integrated into a single digital image file (e.g., a JPEG file, GeoJPEG file, or other image file). The single digital image file is displayable via a web viewer and enables hyperlinks or other links to allow a user to select a link indicator (NB, P2, CTD, etc.) to cause a data item that is associated with the selected link indicator to be displayed in a web viewer.

Figure 6D:
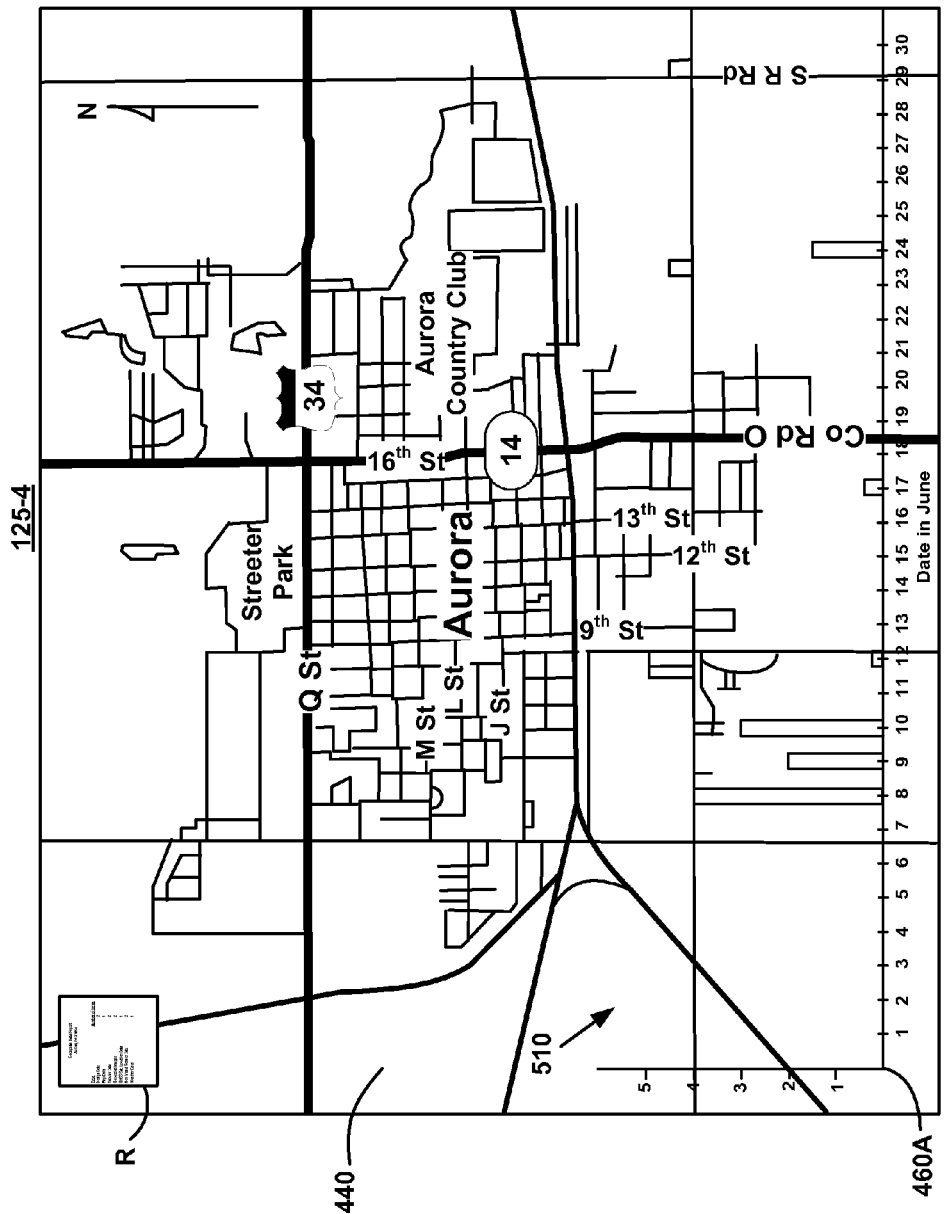

FIG. 6D illustrates integrated image 125-4, which integrates a map along with a depiction of one pre-processed data item and a link to another pre-processed data item. As illustrated in FIG. 6D, integrated image 125-4 is a depiction of data item 440, a map of the physical location of tilt-up building 401. Report 520 is shown as a linkable item by link indicator "R." Overlaid on map 440 is preprocessed data item 510, which depicts the tabular information of data item 460 in a histogram type graph 460A.

Integrated image 125-4 succinctly shows a map of the physical location of Aurora with an overlay that graphically depicts precipitation information for June, 2010. According to one embodiment, system 120 processes data items to create integrated image 125-4 in response to a request 241 for: A) available geospatial information for the physical location of Aurora, Nebr., and B) precipitation in June 2010 for the physical location of Aurora, Nebr. Request processor 250 accesses data item 440 and preprocessed data items 510 and 520 and integrates them. For example, request processor 250 accesses and then positions preprocessed data item 510 in an overlaid fashion on data item 440 (map of Aurora, Nebr.). This may include request processor 250 taking action to scale preprocessed data item 510 and/or data item 440 such that both are visible and well represented in integrated image 125-4. This may also include request processor 250 altering a color, contrast, opacity or other image quality of one or both of data item 440 and preprocessed data item 510. A link indictor "R" in the form of a rectangular report is also overlaid to provide a user selectable link to report 520. After overlay of data item 440 and preprocessed data item 510 and inclusion of link indicator R, request processor 250 renders the data items being integrated into a single digital image file (e.g., a JPEG file, GeoJPEG file, or other image file). The single digital image file is displayable via a web viewer and enables hyperlinks or other links to allow a user to select a link indicator, such as link R, to cause a data item that is associated with the selected link indicator to be displayed in a web viewer.

Similar information can be overlaid and/or linked for other requested (and available or accessible) data. Additionally, a user may request more detailed information, such as precipitation information for a more specific physical location and/or for particular period of time. An integrated image produced in response to a more specific request is illustrated in FIG. 6E.

Figure 6E:
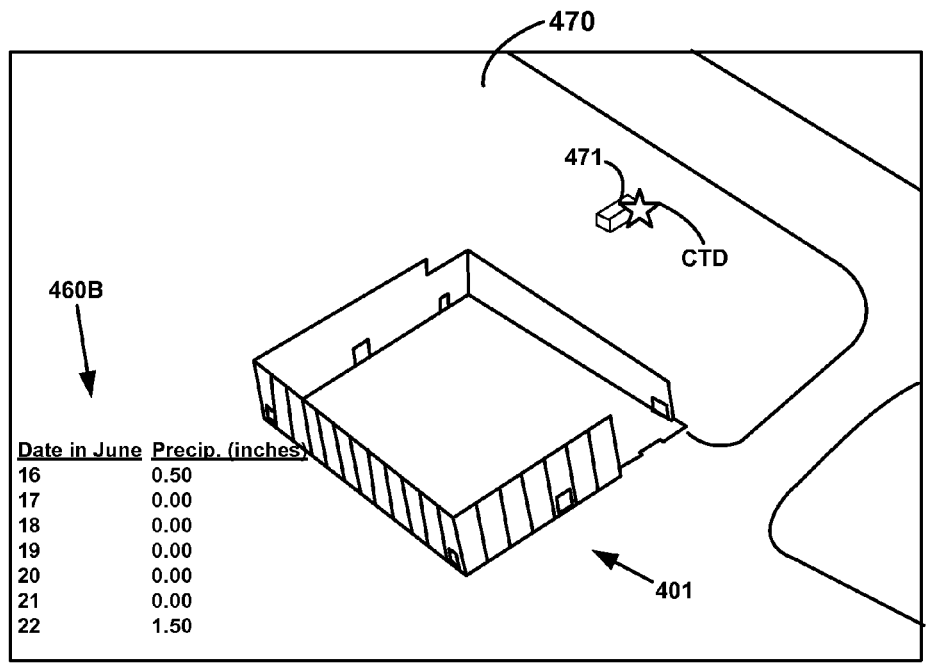

FIG. 6E illustrates integrated image 125-5, which integrates an as-built image along with a depiction of one data item and a link indicator for another data item. As illustrated in FIG. 6E, integrated image 125-5 is a depiction of data item 470 (an as-built northwest aerial perspective) integrated with date/precipitation data subset 460B and container tracking data 490. Overlaid on map 440 is preprocessed data item 510, which depicts subset 460B of the tabular date/precipitation information of data item 460.

According to one embodiment, in response to a request 241 for container tracking data and precipitation information for Jun. 16-22, 2010 for the physical location of tilt-up building 401, request processor 250 accesses data item 470 and data item 460 and integrates them into integrated image 125-5. In one embodiment, this combination of data items (460, 470, and 490) is accessed based on their availability in data store 230 and based on their metadata which satisfies both the time and physical location constraints of the request. For example, request processor 250 accesses data item 460 and extracts weather data subset 460B (date/precipitation information for Jun. 16-22, 2010) and then positions subset 460B in an overlaid fashion on data item 470. This may include request processor 250 taking action to scale subset 460B and/or data item 470 such that both are visible and well represented in integrated image 125-5. This may also include request processor 250 altering a color, contrast, opacity or other image quality of one or both of data item 470 and data subset 460B. Request processor 250 also positions the star-shaped link indicator CTD at the associated physical location expressed by its metadata (note proximity to shipping container 471). After overlay of data item 470 and extracted subset 460B, and positioning of link indicator CTD, request processor 250 renders the data items being integrated into a single digital image file (e.g., a JPEG file, GeoJPEG file, or other image file) this is displayable via a web viewer. It is appreciated that similar information can be overlaid for other requested (and available) information such as temperature measurements. As previously described, in one embodiment, a user may select link indicator CTD (e.g., with a cursor control or other selection technique) to cause a displayable image of data item 490 (the underlying data item associated with link indicator CTD) to be provided for display in a user interface such as a web viewer.

Figure 6F:
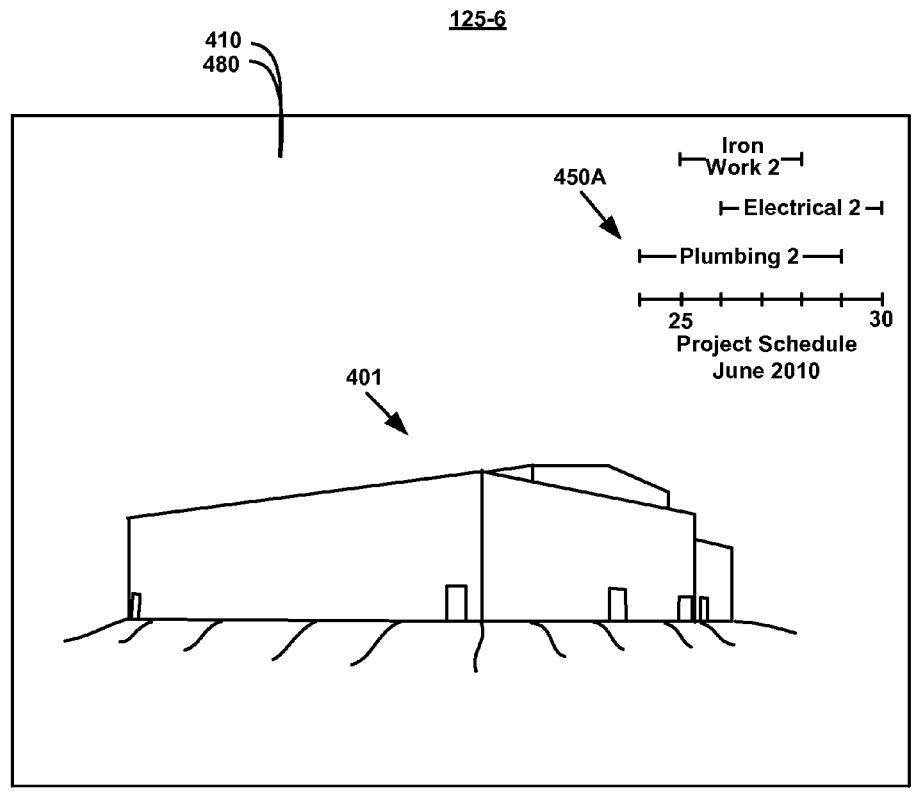

FIG. 6F illustrates integrated image 125-6, which integrates design data, as-built data, and remaining project schedule data. According to one embodiment, in response to a request 241 regarding the physical location of tilt-up building 401 (e.g., a request regarding status as of June 23), request processor 250 accesses data items 410, 450, and 480 from data store 230 and integrates them. FIG. 6F is similar to FIG. 6A except that instead of satellite location data, remaining project schedule data 650A has been overlaid. The integration of diverse data items 410 and 480 with project schedule data 450A thus results in the displayed content of image integrated 125-6. After alignment of component data items (410, 480) and overlay of project schedule data 450A, request processor 250 renders the data items being integrated into a single digital image file (e.g., a JPEG file, GeoJPEG file, or other image file) which is displayable via a web viewer.

Figure 6G:
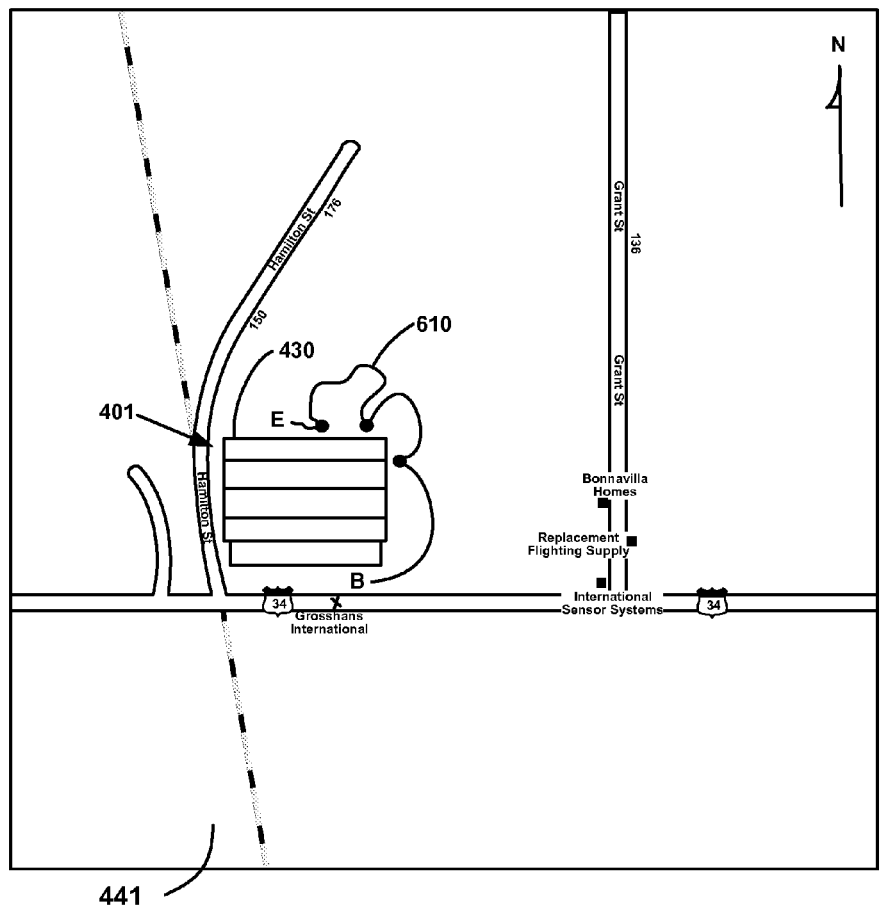

FIG. 6G illustrates integrated image 125-7, which integrates map data, non-visual sensor data, and design data. In integrated image 125-7, path 610 of crane 486 is spatially depicted on map region 441 along with plan view data item 430. A beginning "B" and end "E" of the path are illustrated and correspond with particular times in an operation log, such as crane operation log 485 (FIG. 4I) or a similar log. Conduct of certain actions/operations such as lifts are indicated by black dots along path 610. It is appreciated that paths can similarly be illustrated for other moveable vehicles and assets for which position (and sometimes operation) data is logged. In some instances, particular operations such as "lift" or "dig" or "dump" may be recorded in an operation log and can thus be spatially annotated in some fashion with respect to an integrated image and/or a path.

Example Methods of Use

Figure 8:
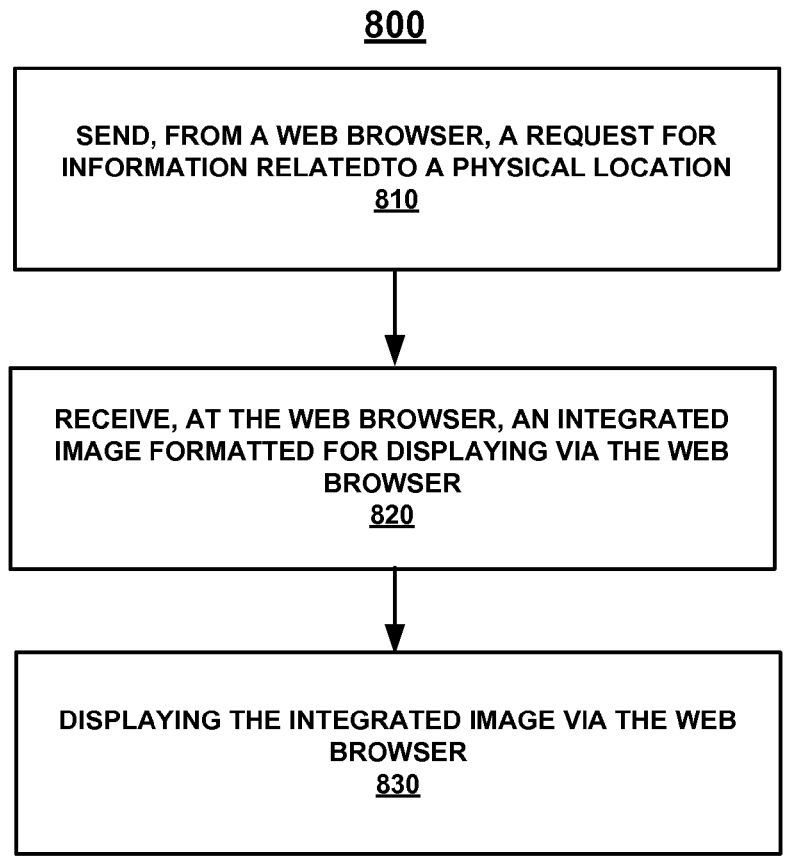
FIG. 8 is a flow diagram of an example method of visually displaying diverse data items via a web viewer, in accordance with an embodiment.

With reference to FIGS. 7 and 8, flow diagrams 700 and 800 illustrate example procedures used by various embodiments. Flow diagrams 700 and 800 include processes and operations that, in various embodiments, are carried out by one or more processors (e.g., processor(s) 1006 of FIG. 10) under the control of computer-readable and computer-executable instructions. It is appreciated that in some embodiments, the one or more processors may be in physically separate locations or electronic devices/computing systems. The computer-readable and computer-executable instructions reside, for example, in tangible data storage features such as volatile memory, non-volatile memory, and/or a data storage unit (see e.g., 1008, 1010, and 1012 of FIG. 10). The computer-readable and computer-executable instructions can also reside on any tangible computer-readable media such as a hard disk drive, floppy disk, magnetic tape, Compact Disc, Digital Versatile Disc, and the like. In some embodiments, the computer-readable storage media is non-transitory. The computer-readable and computer-executable instructions, which may reside on computer-readable storage media, are used to control or operate in conjunction with, for example, one or more components of a visual organizer system 120, a user's electronic computing device or user interface thereof, and/or and or one or more of processors 1006. When executed by one or more computer systems or portion(s) thereof, such as a processor, the computer-readable instructions cause the computer system(s) to perform operations described by the methods of flow diagrams 700 and 800.

Although specific procedures are disclosed in flow diagrams 700 and 800 such procedures are examples. That is, embodiments are well suited to performing various other operations or variations of the operations recited in the processes of flow diagrams 700 and 800. Likewise, in some embodiments, the operations in flow diagrams 700 and 800 may be performed in an order different than presented, not all of the operations described in one or more of these flow diagrams may be performed, and/or one or more additional operation may be added.

Example Methods of Organizing Information

FIG. 7 is a flow diagram 700 of an example method of organizing information, in accordance with various embodiments. Reference will be made to elements of FIGS. 1-6G to facilitate the explanation of the operations of the method of flow diagram 700. In some embodiments, the method of flow diagram 700 describes a use of or instructions for operation of visual organizer system 120.

At operation 710, in one embodiment, a plurality of diverse data items is accessed. In one embodiment, data item accessor 210 accesses the plurality of diverse data items. The accessed diverse data items 201 are related to a physical location. The accessed diverse data items 201 include geospatial data associated with individual data items of the diverse data items 201. In some embodiments one or more of the accessed data items 201 includes time of creation information which is accessed by data item accessor 210. The time of creation data can be data such as a date time group that is either part of the content or metadata of the data item 201 or an additional file that is associated with the data item 201. In one embodiment, the plurality of accessed diverse data items 201 comprises at least a non-visual data item (e.g., 201-4, 201-5, 201-6, 201-10) and a visual imagery data item (e.g., 201-1, 201-2, 201-3, and the like), but can include other types of data items 201 as well.

FIG. 3, and the previously presented discussion thereof, presents numerous examples of different types of data items 201 which may be accessed. For example, among other things, the following types of data items 201 may be represented among the assessed data items: geo-images 201-1, geo-videos 201-2, maps 201-3, non-visual sensor data 201-4, point cloud data 201-5, tabular data 201-6, design data 201-7, as-built data 201-8, weather data 201-9, and GNSS satellite location data 201-10, and other geospatially referenced data 201-n. It is appreciated that the data items 201 may originate from many sources. As electronic devices have multiple functions in some embodiments, a single electronic device may provide more than one type of data item 201. For example, a digital image capture device may also include a positioning capability (e.g., GPS positioning) and an audio recording capability. Such an image capture device may provide geo-images and video and may also provide non-visual sensor data such as position data only or an audio recording that is geo-tagged to a physical location. With respect to position determining devices, such devices may provide coordinates that are in two dimensions or three dimensions with respect to one or more points associated with a physical location and/or an object of interest at a physical location.

At operation 720, in one embodiment, accessed diverse data items 201 are parsed by data type. Data type parser 220, in one embodiment, accomplishes the parsing. Parsing the data items 201 by data type allows visual organizer system 120 to determine proper applications/utilities to open or manipulate various electronic data files during processing and/or pre-processing and to determine what, if any, metadata is associated with the diverse data items 201.

At operation 725, in one embodiment, the method of flow diagram 700 further comprises preprocessing one or more of the diverse data items 201. In one embodiment, preprocessor 225, accomplishes this preprocessing. The nature of preprocessing and whether or not it is accomplished is typically, but not always, based upon a determined data type for each diverse data item 201. A variety of preprocessing actions can be implemented, several examples of which have been previously described. Such preprocessing actions include, but are not limited to: converting data items 201 of a particular type into some common file format; locating geospatial content of a data item 201; stripping unneeded or unwanted content from a data item 201; combining two or more data items 201 (which may be of different types) into a single digital file;

dividing a data 201 item into multiple data items 201; and determining a security access setting to be associated with a data item 201.

At operation 730, in one embodiment, the accessed diverse data items 201 are stored in a data store. In one embodiment, data store 230 is where such data items 201 are stored. In instances where preprocessing has been accomplished, a data item 201 may be stored only in its preprocessed version or in its raw (accessed) version and the preprocessed version. The diverse data items 201 are stored such that they are accessible by one or more of the elements of geospatial data associated that are associated with the individual diverse data items 201 that have been stored. Thus, in one embodiment, a stored data item 201 may be accessed by one or more portions of coordinates or geospatial data with which the data item 201 is associated. For example, data items 201 in data store 230 may be searched and accessed by portions (e.g., significant digits) of latitude, longitude, or a combination of portions of a latitude and longitude. Similarly such data items 201 may be search by other types of associated geospatial data such as county, state, township, and/or zip code. In such a manner, one or more items associated with a set of coordinates may be searched for, found, and accessed from data store 230.

At operation 740, in one embodiment, the diverse data items 201 related to the physical location processed to produce an integrated image 125 comprising an integration of at least two of the stored diverse data items 201. The integrated image 125 is created in a format that is displayable via a web viewer. In one embodiment, request processor 250 performs this processing of the stored diverse data items 201. The processing is initiated in response to visual organizer system 120 receiving from a requesting entity (e.g., user interface 290) a request regarding a particular physical location. The term "processing" used here with respect to processing a request includes the actions of: searching through the stored data items 201 based upon the physical location that is referenced in the received request; selecting two or more items that relate to or in some manner satisfy the request; and integrating those two data items 201 together into integrated image 125. The integrated image (e.g., integrated image 125) may then be stored, provided for access (push or pull access) by the requesting entity, or sent to an entity/location that is specified by a request 241. In some embodiments data item accessor 210 acts under the control of request processor 250 to access certain data items 201 in order to satisfy a request 241.

Processing of the diverse data items 201 can involve request processor 250 including geospatial content presented in a compact image format (e.g., viewable within a small display) with displayable dimensions that are smaller than a full image view of integrated image 125. In other words, when two or more diverse data items 201 are integrated, the portions of the data items 201 that are integrated are scaled relative to one another (if required) so that the resulting integrated image 125 will be able to simultaneously display relevant components of both. FIGS. 6A-6C provide examples of this. With reference to FIG. 6C as but one example, data item 430 (plan view drawing) is scaled and spatially located within region 441 of data item 440 (map). Thus, in this example, both the map and the building were scaled relative to one another to produce integrated image 125-3 which displays the geospatial content of both the map and the plan view drawing (along with other geospatially located information) in a single integrated image 125-3 which may be viewed and easily read/interacted with on display of web viewer without substantial (or possibly without any) scrolling or zooming of the display.

Processing of the diverse data items 201 into an integrated image 125 viewable by a web viewer can involve request processor 250 associating a visual imagery data item with a geolocation data item that has been received from a positioning device. Integrated image 125-5 of FIG. 6E illustrates one example of this by showing the geolocation data of container tracking data item 490 represented as star shaped link indicator CTD geospatially positioned within the field of view of Northwest aerial perspective data item 470.

Processing of the diverse data items 201 into an integrated image 125 viewable by a web viewer can involve request processor 250 associating a visual imagery data item with a location on a map. Integrated image 125-3 of FIG. 6C illustrates one example of this by showing link indicator P2, which is a location reference indicator placed at the physical location of the map where data item 480 (Northwest elevation photo) was captured. As previously discussed, link indicator P2 annotates the availability an image via a selectable area which a user may select in order to link to data item 480. It is appreciated that when a link indicator is embedded during request processing, the integrated image 125 which is produced is not just a plain image file such as a JPEG file, instead another file format such a GeoJPEG may be utilized to support the inclusion of the link indicator.

Processing of the diverse data items 201 into an integrated image 125 viewable by a web viewer can involve request processor 250 processing the diverse data items 201 in conjunction with a selected time span. Such a time span constraint may be thought of a filter which filters based on time. A time span constraint specified within a request 241 and may encompass a span of days or a portion of a single day. In response to such a time constraint, request processor accesses only diverse data items 201 that include an associated time of creation or embedded time information that complies with (fall within) the selected time span. Integrated image 125 is produced from this constrained subset of data items. Integrated image 125-5 of FIG. 6E illustrates one example of this by showing only a subset of precipitation information overlaid upon Northwest aerial perspective data item 470. For example, in response to a request regarding the physical location of tilt-up building 401 that requested precipitation information and container tracking data for Jun. 16-Jun. 22, 2010, request processor 250 produces integrated image 125-5. As can be seen, by filtering on time, a scene (such as the scene formed by integrated image 125-5) begins to answer questions like: "Looking back, what did we know about the overall environment/situation at a certain point in time that would have influenced our next-step decisions?"; "Where were my people and assets at the time this happened?"; "What did they know/see?"; What does a then/now comparison look like, and how did something change?". As would be expected, the data that can be constrained/filtered by time depends upon the data that is accessible. However, as can be seen such time filtering of a scene provides useful situational forensics and may aid an user's ability to cost effectively address potential litigation challenges and to solve many perplexing questions involving how things happened and where things were located.

In one embodiment, a user interface may include a user manipulable timeline constraint interface such as one or more timeline sliders that allow a user to easily "move through time" by manipulating a slider with a cursor control device or other interface selection mechanism (i.e., touch screen) to advance or rewind the data which is displayed in the scene formed by an integrated image. Via such input, a user may instruct a visual organizer system to filter the data in a scene by time. This causes the visual organizer system to process diverse data items 201 into an integrated image 125 (or a plurality of integrated images) which allow a user to see how overall scene as related to a particular situation has evolved by applying time factoring to each content source of data which is integrated into the integrated image.

Processing of the diverse data items 201 into an integrated image 125 viewable by a web viewer can involve request processor 250 accessing a database containing design documentation for an object of interest at a physical location. Such a database may be included in data store 230 or may be accessible via data item accessor 210 (if information is pulled based on a request 241). The design documentation is then associated with (e.g., integrated into) the integrated image 125. Integrated image 125-1 of FIG. 6F shows one example of this with the integration of the design data of data item 410 (FIG. 4A) with the as-built information of data item 480 (FIG. 4H). The processing may further include accessing upcoming steps in a project timeline file and associating the upcoming steps with the integrated image 125. Integrated image 125-6 also illustrates an example of inclusion of the upcoming (remaining) steps, by including project schedule data 450A (an extracted portion of the construction project schedule of data item 450 of FIG. 4D).

Processing of the diverse data items 201 into an integrated image 125 viewable by a web viewer can involve request processor 250 accessing weather data for a physical location specified in a request 241. The request may be generic or specific. A generic request may only request temperature(s) for a physical location. A specific request may specify something such as the precipitation measured for a certain range of dates at a physical location. The physical location may be specified as a region (e.g., state, county, town, zip code) or by coordinate information. The weather data that is accessed is then associated with the integrated image 125. The association can be by a mechanism such as a link indicator or by overlaying tabular or graphical information as part of the integrated image 125. In one embodiment, the weather data that is associated with the integrated image 125 comprises or covers a time span that is received in the request for weather data at a physical location. FIG. 6D shows one example of providing precipitation measurements for a region (e.g., zip code or town) in a graphical format. FIG. 6E shows an example of providing precipitation information for a certain range of dates (Jun. 16-22, 2010) for a specified coordinate location.

Processing of the diverse data items 201 into an integrated image 125 viewable by a web viewer can involve request processor 250 accessing non-visual data regarding a geolocated path of a machine while performing a selected operation at the physical location and associating the geolocated path with the integrated image 125. Similarly the path and or current/previous location(s) of a moveable or mobile object of interest may be geolocated with respect to an integrated image 125. Such a path may be maintained in a log such as an operation or tracking log which is populated by a reporting source coupled with a construction equipment item or asset such as crane or other material moving or handling construction equipment asset. Integrated image 125-7 of FIG. 6G illustrates one example of such integration. In integrated image 125-7, path 610 of crane 486 is depicted on map region 441 along with plan view data item 430. A beginning "B" and end "E" of the path are illustrated. Request processor 250 access data for illustrating path 610 from crane operation log 485 (FIG. 4I) or a similar log. Similarly, integrated image 125-5 of FIG. 6E illustrates star shaped link indicator CTD being spatially positioned relative to the image content of integrated image 125-5 to annotate a location of a moveable object of interest (container 471) and provide a link to container tracking data item 490.

Processing of the diverse data items 201 into an integrated image 125 viewable by a web viewer can involve request processor 250 accessing non-visual data in the form of a point cloud of geolocated data points representative of features associated with an object of interest, such as a building, structure, natural feature or the like at a physical location. If the points have not been preprocessed into an image, request processor 250 processes the points of the point cloud to render or create a visual display of the features which have been scanned or otherwise measured to create the data points. The rendered/created image is then associated with an integrated image 125. Data item 410 (Northwest perspective) of FIG. 4A illustrates a design drawing of tilt-up building 401. In one embodiment, an image rendered from a point cloud would look similar to FIG. 4A, but represent an as-built state instead of a design state of tilt-up building 401. As such, request processor 250 would process and integrate a point cloud image in a similar manner as has been previously described and depicted for the integration of data item 410.

Processing of the diverse data items 201 into an integrated image 125 viewable by a web viewer can involve request processor 250 processing the diverse data items 201 in conjunction with a data privilege of or associated with the request which generated the creation of the integrated image 125. For example, in one embodiment, only diverse data items 201 that are consistent with data privilege are accessed for production of the integrated image 125. The data privilege may be explicit with in a request 241, and thus prevent use of certain in the processing and creation of an integrated image 125. The data privilege may also be inherent in a request 241, such as a particular user not having access privileges or clearance to certain data items 201 and therefore those data items 201 not being accessed by request processor 250. As an example, a subcontractor may have access to visual organizer system 120, but data privileges may not extend to all available data. For example, a subcontractor may be allowed access to data item 450 (project schedule), but excluded from access to (or even awareness of existence of) data item 465, a supervisor's site notebook entry.

Processing of the diverse data items 201 into an integrated image 125 viewable by a web viewer can involve request processor 250 processing the diverse data items 201 related to the physical location such that a particular data type of data items is formatted to be displayable in the integrated image 125 in a manner specified by the request. For example, in one embodiment, a request 241 involving precipitation measurements for a physical location may request that this weather data be displayed as tabular information, as graphical information, or as linked information represented by a link indicator. Integrated image 125-3 of FIG. 6C shows an example of annotating availability of weather data with link indicator W. Integrated image 125-4 of FIG. 6D shows an example of illustrating weather data item 460 graphically in an integrated image. Integrated image 125-5 of FIG. 6E shows an example of illustrating a subset 460B of weather data item 460 in a tabular fashion in an integrated image.

At operation 750, in one embodiment, the method illustrated by flow diagram 700 further comprises providing the integrated image 125 in response to the request. In one embodiment, the produced integrated image 125 is pushed out to the requester or to an entity or destination specified by the originating request 241. In another embodiment, the produced integrated image 125 is stored and made available for pull access by the requesting entity and/or other entities.

Example Method of Visually Displaying Diverse Data Items Via a Web Viewer

FIG. 8 is a flow diagram 800 of an example method of visually displaying diverse data items 201 via a web viewer, in accordance with an embodiment. Reference will be made to elements of FIGS. 1-6G to facilitate the explanation of the operations of the method of flow diagram 800. In one embodiment, the method of flow diagram 800 describes a use or instructions for accessing and corresponding with visual organizer system 120 via a use of a user interface 290 to request and/or access an integrated image 125.

At operation 810, in one embodiment, a request 241 for information related to a physical location is sent from a user interface. In one embodiment, user interface 290 sends the request 241 in response to received user input. User interface 290 may be a web viewer located an electronic device with a display capability. Other specifications and/or constraints may be provided in conjunction with or as part of the request 241. Numerous examples of specifications and/or constraints are discussed in conjunction with description of request generator 900 of FIG. 9

Figure 9:
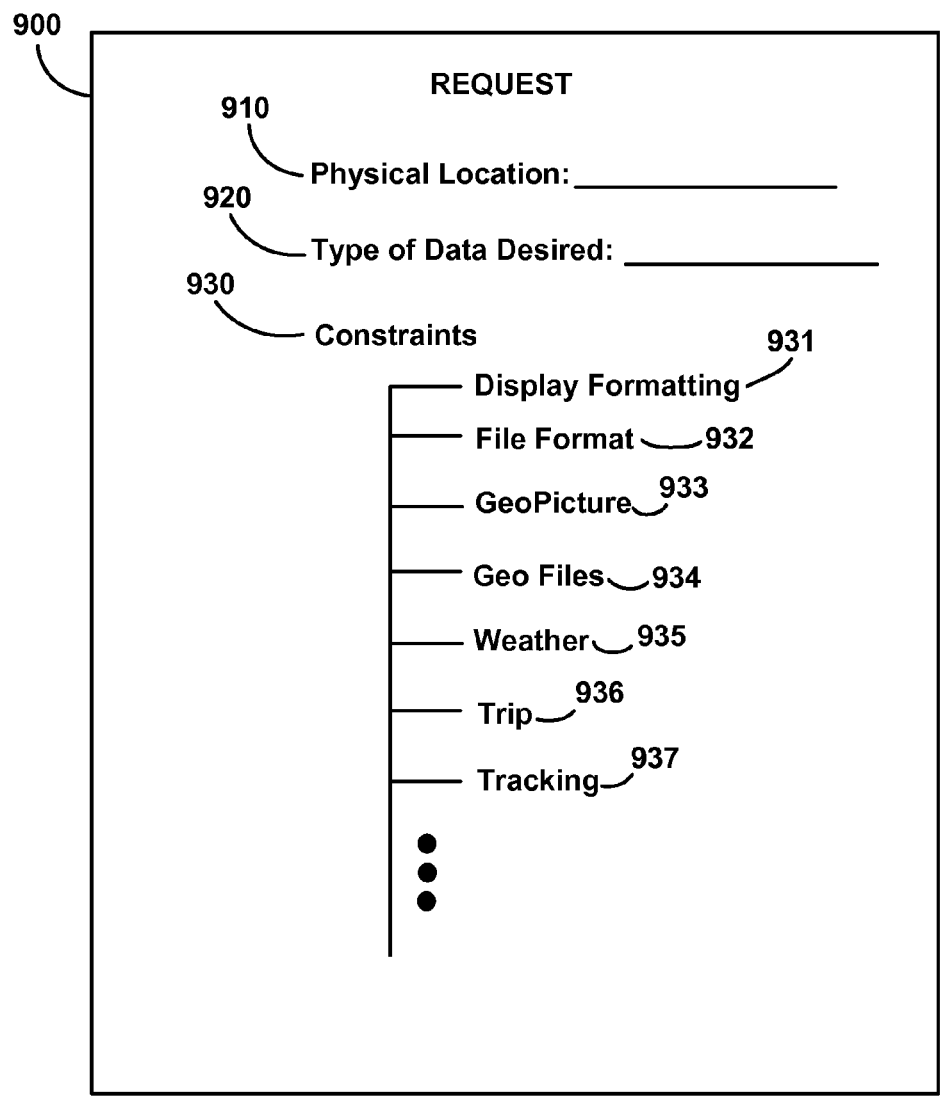
FIG. 9 illustrates one example of a request generator user interface, in accordance with an embodiment.

FIG. 9 illustrates one example of a request generator 900, which is a user interface for generating a request 241 to a visual organizer system 120, in accordance with an embodiment. Request generator 900 may be displayed for user input on a web viewer of a display on an electronic computing device. As such, request generator 900 may be a served web page (e.g., from visual organizer system 120 or an application located on a user's electronic device. A request generator 900 includes at least a physical location input area 910 and may additionally include one or more of a type of data desired input area 920 and a selector for constraints 930.

Physical location input area 910 allows for a user to input a physical location in general terms (e.g., state, county, city, town, zip code, township, or the like) or specific terms such as several significant digits of at least two dimensions (e.g., latitude and longitude) of coordinates.

Type of data desired input area 920, when included, allows a user to specify general or specific types of data that are desired, such as images, drawings, tabular, or any of the various types of data which may be data items 201 which may be indentified via parsing that is conducted by visual organizer system 120. Such a selection of a type of data narrows the scope of request 241 which is generated.

Constraints 930, when included, also allow narrowing of a request 241 and additionally or alternatively facilitate providing further content in the request for directing visual organizer system 120 to tailor of an integrated image 125 which is generated as a result of the request 241. Constraints 930 may be thought of as a toolbox for controlling or focusing the operation of visual organizer system 120. Several example constraints 931-937 are depicted as a drop down list. One, all, none, or some combination of constraints 931-937 may be present in an embodiment of a request generator 900. Other constraints may additionally or alternatively be included in a request generator 900.

Display formatting constraint 931 allows a user to add display parameters to a request 241. Such parameters can include resolution and color capabilities of a display utilized by a web viewer for which the requested integrated image 125 will be generated or for specifying file types which can be displayed by the web viewer or how to display certain file types (e.g., as tabular data, as a link indicator, as an image, as a graph, etc.) In one embodiment, user interaction with display formatting constraint 931 allows generating and sending from the web viewer (in conjunction with a request 241), a specification of a display parameter for formatting a particular data type of the data items 201. In one embodiment, user interaction with display formatting constraint 931 allows generating and sending from the web viewer (in conjunction with a request 241), a specification to format surveying points of a surveying work order file to be rendered at respective geolocations of the survey points on a web viewer displayable map. In one embodiment, user interaction with display formatting constraint 931 allows generating and sending from the web viewer (in conjunction with a request 241), a specification to format geocoded data files to be represented at their associated geolocations on a web viewer displayable map. In one embodiment, user interaction with display formatting constraint 931 allows generating and sending from the web viewer (in conjunction with a request 241), a specification to extract geocoded data points from a data structure and represent the points spatially at their associated geolocations as markers on a web viewer displayable map. In one embodiment, user interaction with display formatting constraint 931 allows generating and sending from the web viewer (in conjunction with a request 241), a specification to display a surveying data point cloud as a raster representation at associated geolocations on a web viewer displayable map.

File format constraint 932 allows a user to specify one or more selected file types which visual organizer system 120 should attempt to include in a generated integrated image 125. Any of the numerous file formats which visual organizer system 120 parses data items 201 into may be specified for inclusion in an integrated image 125. Such file format constraints may be added to a request 241 that is sent.

GeoPicture constraint 933 allows a user to specify that geocoded JPEGs from GNSS enabled digital image capture devices should be displayed as push pins or other shapes of link indicators on a map while other non-geocoded JPEGs (e.g., an image geospatially associated with a physical location but not captured and geocoded by a GNSS enabled digital image capture device) are shown in a special holding areas. In one embodiment, user interaction with GeoPicture constraint 933 allows generating and sending from the web viewer (in conjunction with a request 241), a specification to format geocoded Joint Photographic Experts Group (GeoJPEG) files to be represented as selectable pushpins located at the geolocations on a web viewer displayable map.

GeoFiles constraint 934 allows a user to specify that all geocoded data files should be displayed as push pins or other shapes of link indicators on a map or compiled into a report or represented on a map. Thus, geocoded files in formats such as DXF, DWG, KML, JPEG, GeoTIFF and GeoJPEG (and other geocoded data formats) would be displayed as link indicators on a map of the specified physical location or else compiled into a report. In one embodiment, user interaction with GeoFiles constraint 934 allows generating and sending from the web viewer (in conjunction with a request 241), a specification to format all geocoded files to be represented as selectable pushpins or other specified or default shapes of link indicators located at the geolocations on a web viewer displayable map. FIG. 5B illustrates an example geospatial data report 520, while FIG. 6C illustrates a link indicator R that links to report 520. In one embodiment, user interaction with GeoFiles constraint 934 allows generating and sending from the web viewer (in conjunction with a request 241), a specification to list all geocoded files for a physical location in a report. The report may be associated with a map of the physical location and displayable via a web viewer. Report 520 of FIG. 5B provides one example of such a report.

In one embodiment, weather constraint 935 allows a user to specify formats for displaying historical weather data and/or to request access and display of current weather data. Weather constraint 935 allows a user to specify a number of options such as to have historical weather data as tabular data, graphical data, or link indicator(s) and/or to specify certain date/time ranges of historical weather data to be included in an integrated image 125. In one embodiment, user interaction with weather constraint 935 allows generating and sending from the web viewer (in conjunction with a request 241), a specification to format geocoded weather data to be represented at associated geolocations on a web viewer displayable map.

In one embodiment, trip constraint 936 allows a user to specify that geocoded trip data (images, audio, reported locations, receipts, activity logs) to be displayed along a traveled path. It is appreciated that a device such as a GNSS receiver equipped cellular phone may provide some or all of the data items 201 that constitute geocoded trip data. Trip constraint 936 also allows a user to specify that data items 201 received from a particular source should be included in an integrated image 125. In one embodiment, user interaction with trip constraint 936 allows generating and sending from the web viewer (in conjunction with a request 241), a specification to display recorded geocoded trip data at associated geolocations on a web viewer displayable map. Such trip data can includes a route and one or more of recorded audio, recorded video, and an image associated with geolocations of the route.

In one embodiment, tracking constraint 937 allows the current and/or historical positions of a person or item (container, equipment, vehicle, etc.) being tracked to be selected for display. It is appreciated that a device such as a cellular phone or position reporting device may provide some or all of the data items 201 that constitute geocoded tracking data. User interaction with tracking constraint 937 allows generating and sending from the web viewer (in conjunction with a request 241), a specification to display a representation of a tracked object at a real-time and/or historical geolocation of the tracked object on a web viewer displayable map.

At operation 820, in one embodiment, in response to sending the request for information, an integrated image 125 is received by the requesting user interface. The integrated image 125 is formatted for displaying via the requesting web viewer. The integrated image 125 is also formatted in to include any requested data and to comply with any requested constraints. The integrated image 125 is created, in one embodiment, by visual organizer system 120 in a manner previously described herein, and is thus processed from a plurality of diverse data items 201 related to the physical location specified in request 241. Additionally, the received integrated image 125 comprises an integration of at least two previously stored diverse data items 201 that are related to the physical location specified in request 241. Further, in some embodiment more data items 201 may also be accessed and integrated, including data items 201 that are not currently in data store 230. The stored diverse data items 201 in data store 230 include at least a non-visual data item and a visual imagery data item. As previously described, geospatial data is associated with each of the individual data items of the diverse data items 201 that are stored in data store 230.

At operation 830, in one embodiment, the received integrated image 125 that was created in response to the request for information is displayed via the web viewer that was used to issue the request for information. This comprises displaying the integrated image 125 on a display of an electronic device which is running the web viewer.

Example Computer System Environment

Figure 10:
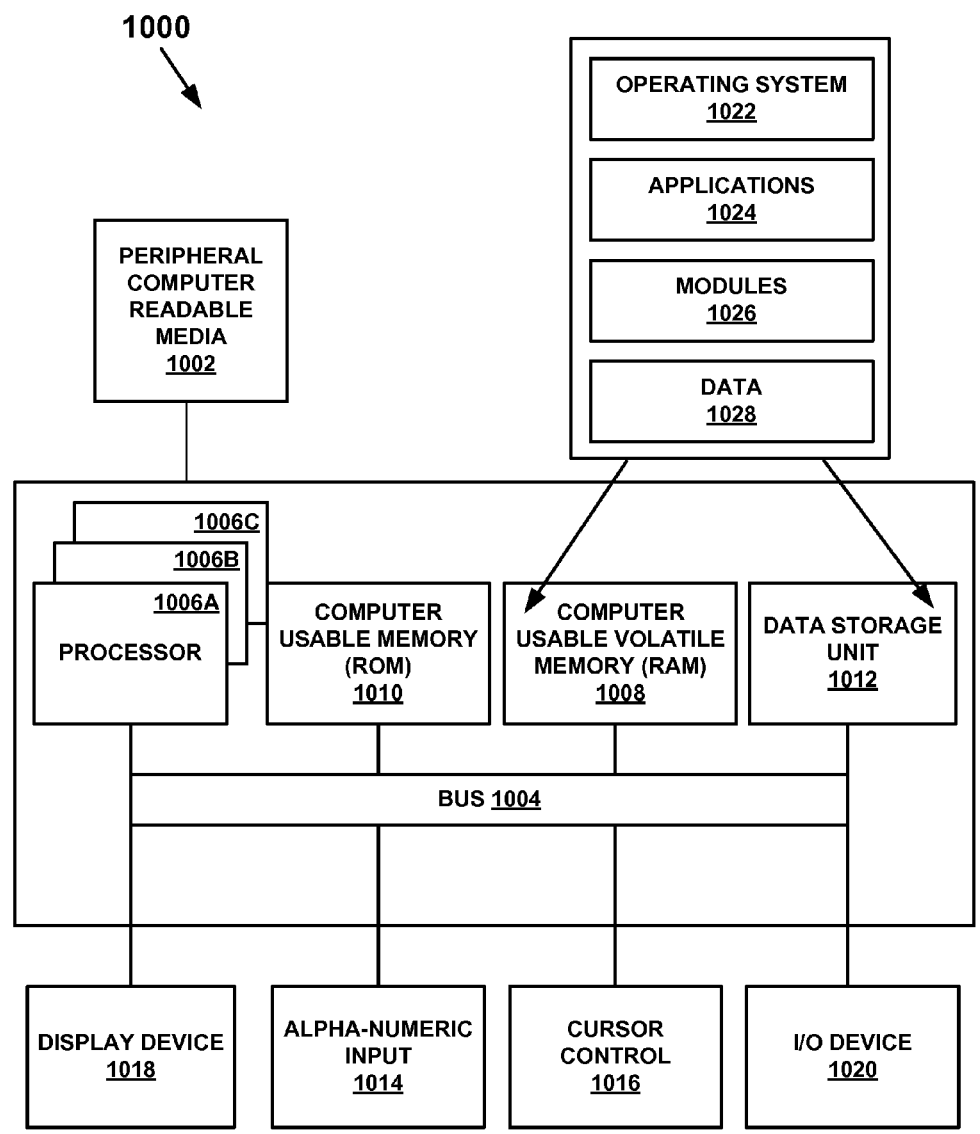
FIG. 10 illustrates a block diagram of an example computer system with which or upon which various embodiments of the present invention may be implemented.

With reference now to FIG. 10, all or portions of some embodiments described herein are composed of computer-readable and computer-executable instructions that reside, for example, in computer-usable/computer-readable storage media of a computer system. That is, FIG. 10 illustrates one example of a type of computer (computer system 1000) that can be used in accordance with or to implement various embodiments which are discussed herein. It is appreciated that computer system 1000 of FIG. 10 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multi-media devices, and the like. Computer system 1000 of FIG. 10 is well adapted to having peripheral non-transitory computer-readable storage media 1002 such as, for example, a floppy disk, a compact disc, digital versatile disc, other disc based storage, universal serial bus "thumb" drive, removable memory card, and the like coupled thereto.

System 1000 of FIG. 10 includes an address/data bus 1004 for communicating information, and a processor 1006A coupled with bus 1004 for processing information and instructions. As depicted in FIG. 10, system 1000 is also well suited to a multi-processor environment in which a plurality of processors 1006A, 1006B, and 1006B are present. Conversely, system 1000 is also well suited to having a single processor such as, for example, processor 1006A. Processors 1006A, 1006B, and 1006B may be any of various types of microprocessors. System 1000 also includes data storage features such as a computer usable volatile memory 1008, e.g., random access memory (RAM), coupled with bus 1004 for storing information and instructions for processors 1006A, 1006B, and 1006B.

System 1000 also includes computer usable non-volatile memory 1010, e.g., read only memory (ROM), coupled with bus 1004 for storing static information and instructions for processors 1006A, 1006B, and 1006B. Also present in system 1000 is a data storage unit 1012 (e.g., a magnetic or optical disk and disk drive) coupled with bus 1004 for storing information and instructions. System 1000 also includes an optional alphanumeric input device 1014 including alphanumeric and function keys coupled with bus 1004 for communicating information and command selections to processor 1006A or processors 1006A, 1006B, and 1006B. System 1000 also includes an optional cursor control device 10110 coupled with bus 1004 for communicating user input information and command selections to processor 1006A or processors 1006A, 1006B, and 1006B. In one embodiment, system 1000 also includes an optional display device 1018 coupled with bus 1004 for displaying information.

Referring still to FIG. 10, optional display device 1018 of FIG. 10 may be a liquid crystal device, cathode ray tube, plasma display device or other display device suitable for creating graphic images and alphanumeric characters recognizable to a user. Optional cursor control device 1016 allows the computer user to dynamically signal the movement of a visible symbol (cursor) on a display screen of display device 1018 and indicate user selections of selectable items displayed on display device 1018. Many implementations of cursor control device 1016 are known in the art including a trackball, mouse, touch pad, joystick or special keys on alphanumeric input device 1014 capable of signaling movement of a given direction or manner of displacement. Alternatively, it will be appreciated that a cursor can be directed and/or activated via input from alphanumeric input device 1014 using special keys and key sequence commands System 1000 is also well suited to having a cursor directed by other means such as, for example, voice commands. System 1000 also includes an I/O device 1020 for coupling system 1000 with external entities. For example, in one embodiment, I/O device 1020 is a modem for enabling wired or wireless communications between system 1000 and an external network such as, but not limited to, the Internet.

Referring still to FIG. 10, various other components are depicted for system 1000. Specifically, when present, an operating system 1022, applications 1024, modules 10210, and data 1028 are shown as typically residing in one or some combination of computer usable volatile memory 1008 (e.g., RAM), computer usable non-volatile memory 1010 (e.g., ROM), and data storage unit 1012. In some embodiments, all or portions of various embodiments described herein are stored, for example, as an application 1024 and/or module 10210 in memory locations within RAM 1008, computer-readable storage media within data storage unit 1012, peripheral computer-readable storage media 1002, and/or other tangible computer-readable storage media.

The foregoing descriptions of specific embodiments have been presented for purposes of illustration and description. They are not intended to be exhaustive or to limit the presented technology to the precise forms disclosed, and obviously many modifications and variations are possible in light of the above teaching. The embodiments were chosen and described in order to best explain the principles of the presented technology and its practical application, to thereby enable others skilled in the art to best utilize the presented technology and various embodiments with various modifications as are suited to the particular use contemplated.

What is claimed is:

1. A method of organizing information, said method comprising:
   accessing a plurality of diverse data items related to a physical location, said diverse data items including geospatial data associated with individual data items of said diverse data items, said diverse data items comprising at least a non-visual data item and a visual imagery data item;
   parsing said diverse data items by data type;
   storing said diverse data items in a data store such that said diverse data items are accessible by one or more of said geospatial data associated with said individual data items; and
   in response to receiving a request regarding said physical location, processing said diverse data items related to said physical location to produce an integrated image displayable via a web viewer, said integrated image comprising an integration of at least two of said stored diverse data items, wherein said at least two of said stored diverse data items comprises a first image of an as-built condition of said object of interest at said physical location and a second image of a design of said object of interest, wherein said processing comprises:
      overlaying said first image with said second image; and
      adjusting an opacity of at least one of said first image and said second image such that said first image and said second image may be overlapped without obscuring visible content of either said first image or said second image.

2. The method as recited in claim 1, further comprising:
   preprocessing said diverse data items based upon a determined data type for each diverse data item.

3. The method as recited in claim 1, further comprising providing said integrated image in response to said request.

4. The method as recited in claim 1, wherein said accessing a plurality of diverse data items related to a physical location, said diverse data items including geospatial data associated with individual data items of said diverse data items further comprises:
   additionally accessing time of creation data associated with least one of said diverse data items.

5. The method as recited in claim 1, wherein said accessing a plurality of diverse data items related to a physical location comprises:
   accessing at least one non-visual data item from an image capture device.

6. The method as recited in claim 1, wherein said accessing a plurality of diverse data items related to a physical location comprises:
   accessing a tabular data item associated with a geolocation.

7. The method as recited in claim 1, wherein said accessing a plurality of diverse data items related to a physical location comprises:
   accessing at least one non-visual sensor data item from a position determining device, said at least one non-visual sensor data item comprising three dimensional coordinate information about one or more points associated with said physical location.

8. The method as recited in claim 1, wherein said accessing a plurality of diverse data items related to a physical location, said diverse data items including geospatial data associated with individual data items of said diverse data items comprises:
   accessing at least one of said data items wherein said geospatial data associated therewith comprises position data associated with a design of an object of interest designed for said physical location.

9. The method as recited in claim 1, wherein said processing said diverse data items related to said physical location to produce an integrated image displayable via a web viewer comprises:
   including geospatial content presented in a compact image format with displayable dimensions that are smaller than a full image view of said integrated image.

10. The method as recited in claim 1, wherein said processing said diverse data items related to said physical location to produce an integrated image displayable via a web viewer comprises:
    associating said visual imagery data item with a geolocation received from a positioning device to create a geolocated image.

11. The method as recited in claim 1, wherein said processing said diverse data items related to said physical location to produce an integrated image displayable via a web viewer comprises:
    associating said visual imagery data item with a location on a map.

12. The method as recited in claim 11, wherein said associating said visual imagery data item with a location on a map comprises:
    creating a link between said visual imagery data item and a location reference indicator located on said map.

13. The method as recited in claim 1, wherein said processing said diverse data items related to said physical location to produce an integrated image displayable via a web viewer comprises:
    processing said diverse data items in conjunction with a selected time span such that only said diverse data items with an associated time of creation or embedded time information which comply with said selected time span are accessed for production of said integrated image.

14. The method as recited in claim 1, wherein said processing said diverse data items related to said physical location to produce an integrated image displayable via a web viewer further comprises:
   accessing a database containing design documentation for an object of interest at said physical location; and
   associating said design documentation with said integrated image.

15. The method as recited in claim 14, wherein said accessing design documentation further comprises:
   accessing upcoming steps in a construction project timeline file; and
   associating said upcoming steps with said integrated image.

16. The method as recited in claim 1, wherein said processing said diverse data items related to said physical location to produce an integrated image displayable via a web viewer further comprises:
   preparing a report detailing geocoded information associated with said physical location; and
   associating said report with said integrated image.

17. The method as recited in claim 16, wherein said preparing a report detailing geocoded information associated with said physical location comprises:
   preparing said report to present said geocoded information in a format selected from the group of formats consisting of DXF, DWG, KML, GeoTIFF, and GeoJPEG.

18. The method as recited in claim 1, wherein said processing said diverse data items related to said physical location to produce an integrated image displayable via a web viewer further comprises:
   accessing weather data for said physical location; and
   associating said weather data with said integrated image.

19. The method as recited in claim 18, wherein said accessing weather data for said physical location comprises:
   associating only said weather data which comprises a selected time span received in said request regarding said physical location.

20. The method as recited in claim 1, wherein said processing said diverse data items related to said physical location to produce an integrated image displayable via a web viewer further comprises:
   creating an annotation disposed in said integrated image.

21. The method as recited in claim 20, wherein said creating a series of annotations disposed in said integrated image comprises:
   creating said annotation wherein said annotation is selected a set of icons that include prepackaged formats for displaying textual notations and prepackaged shapes.

22. The method as recited in claim 1, wherein said processing said diverse data items related to said physical location to produce an integrated image displayable via a web viewer further comprises:
   accessing non-visual data regarding a geolocated path of a machine while performing a selected operation at said physical location; and
   associating said geolocated path with said integrated image.

23. The method as recited in claim 1, wherein said processing said diverse data items related to said physical location to produce an integrated image displayable via a web viewer further comprises:
   accessing non-visual data regarding current and previous locations of a mobile object of interest; and
   associating with said integrated image one or more of said current and previous locations of said object of interest which coincide with said physical location.

24. The method as recited in claim 1, wherein said processing said diverse data items related to said physical location to produce an integrated image displayable via a web viewer further comprises:
   accessing non-visual data regarding operational details of a machine while performing a selected operation at said physical location; and
   associating said operational details with said integrated image.

25. The method as recited in claim 1, wherein said processing said diverse data items related to said physical location to produce an integrated image displayable via a web viewer further comprises:
   accessing non-visual data in the form of a point cloud of geolocated data points representative of features associated with an object of interest at said physical location;
   processing said point cloud to create a visual display of said features; and
   associating said features with said integrated image.

26. The method as recited in claim 1, wherein said processing said diverse data items related to said physical location to produce an integrated image displayable via a web viewer comprises:
   processing said diverse data items in conjunction with a data privilege of said request such that only said diverse data items consistent with data privilege are accessed for production of said integrated image.

27. The method as recited in claim 1, wherein said processing said diverse data items related to said physical location to produce an integrated image displayable via a web viewer comprises:
   processing said diverse data items related to said physical location such that a particular data type of processed data items is formatted to be displayable in said integrated image in a manner specified by said request.

28. A non-transitory computer-readable storage medium having computer-readable instructions stored thereon, which, when executed, caused a computer system to perform a method of organizing information, said method comprising:
   accessing a plurality of diverse data items related to a physical location, said diverse data items including geospatial data associated with individual data items of said diverse data items, said diverse data items comprising at least a non-visual data item and a visual imagery data item;
   parsing said diverse data items by data type;
   preprocessing said diverse data items based upon a determined data type for each diverse data item; and
   storing said preprocessed diverse data items in a data store such that said preprocessed diverse data items are accessible by said geospatial data associated with said individual diverse data items;
   in response to receiving a request regarding said physical location, processing said diverse data items related to said physical location to produce an integrated image displayable via a web viewer, said integrated image comprising an integration of at least two of said stored diverse data items, wherein said at least two of said stored diverse data items comprises a first image of an as-built condition of said object of interest at said physical location and a second image of a design of said object of interest, wherein said processing comprises:
   overlaying said first image with said second image; and adjusting an opacity of at least one of said first image and said second image such that said first image and said second image may be overlapped without obscuring visible content of either said first image or said second image.

29. The non-transitory computer-readable storage medium of claim 28, wherein said accessing a plurality of diverse data items related to a physical location, said diverse data items including geospatial data associated with individual data items of said diverse data items further comprises:
additionally accessing time of creation data associated with least one of said diverse data items.

30. The non-transitory computer-readable storage medium of claim 28, wherein said accessing a plurality of diverse data items related to a physical location comprises:
accessing at least one non-visual data item from an image capture device.

31. The non-transitory computer-readable storage medium of claim 28, wherein said accessing a plurality of diverse data items related to a physical location comprises:
accessing a tabular data item associated with a geolocation.

32. The non-transitory computer-readable storage medium of claim 28, wherein said accessing a plurality of diverse data items related to a physical location comprises:
accessing at least one non-visual sensor data item from a position determining device, said at least one non-visual sensor data item comprising three dimensional coordinate information about one or more points associated with said physical location.

33. The non-transitory computer-readable storage medium of claim 28, wherein said accessing a plurality of diverse data items related to a physical location, said diverse data items including geospatial data associated with individual data items of said diverse data items comprises:
accessing at least one of said data items wherein said geospatial data associated therewith comprises position data associated with a design of an object of interest designed for said physical location.

34. The non-transitory computer-readable storage medium of claim 28, wherein said preprocessing said diverse data items based upon a determined data type for each diverse data item further comprises:
combining a plurality of said diverse data items of differing data types into a single digital file.

35. An information organizing system, said system comprising:
a data item accessor configured for accessing a plurality of diverse data items related to a physical location, said diverse data items including geospatial data associated with individual data items of said diverse data items, said diverse data items comprising at least a non-visual data item and a visual imagery data item;
a data type parser configured for parsing said diverse data items by data type;
a preprocessor configured for preprocessing said diverse data items based upon a determined data type for each diverse data item;
a data store configured for storing said preprocessed diverse data items such that said preprocessed diverse data items are accessible by said geospatial data associated with said individual data items;
a request receiver configured for receiving a request regarding said physical location; and
a request processor configured for processing said diverse data items related to said physical location to produce an integrated image displayable via a web viewer, said integrated image comprising an integration of at least two of said stored diverse data items, wherein said at least two of said stored diverse data items comprises a first image of an as-built condition of said object of interest at said physical location and a second image of a design of said object of interest, wherein said processing comprises overlaying said first image with said second image, and wherein said processing further comprises adjusting an opacity of at least one of said first image and said second image such that said first image and said second image may be overlapped without obscuring visible content of either said first image or said second image.

36. The system of claim 35, wherein said request processor is further configured for processing said diverse data items related to said physical location such that a particular data type of processed data items is formatted to be displayable in said integrated image in a manner specified by said request.

37. A method of visually displaying diverse data items via a web viewer, said method comprising:
sending, from said web viewer, a request for information related to a physical location;
in response to sending said request, receiving an integrated image formatted for displaying via said web viewer, said integrated image processed from a plurality of diverse data items related to said physical location, said integrated image comprising an integration of at least two previously stored diverse data items related to said physical location and a first image of an as-built condition of an object of interest at said physical location overlaid with a second image of a design of said object of interest, wherein said stored diverse data items comprise at least a non-visual data item and a visual imagery data item, and wherein geospatial data is associated with individual data items of said stored diverse data items;
adjusting an opacity of at least one of said first image and said second image such that said first image and said second image may be overlapped without obscuring visible content of either said first image or said second image; and
displaying said integrated image via said web viewer.

38. The method as recited in claim 37, wherein said sending, from said web viewer, a request for information related to a physical location further comprises:
sending, from said web viewer, said request for said information related to said physical location and a specification of a display parameter for formatting a particular data type of said data items.

39. The method as recited in claim 38, wherein said sending a specification of a display parameter for formatting a particular data type of said data items comprises:
sending said specification to format geocoded Joint Photographic Experts Group (GeoJPEG) files to be represented as selectable pushpins located at geolocations on a web viewer displayable map.

40. The method as recited in claim 38, wherein said sending a specification of a display parameter for formatting a particular data type of said data items comprises:
sending said specification to format surveying points of a surveying work order file to be rendered at respective geolocations of said survey points on a web viewer displayable map.

41. The method as recited in claim 38, wherein said sending a specification of a display parameter for formatting a particular data type of said data items comprises:
sending said specification to format geocoded data files to be represented at their associated geolocations on a web viewer displayable map.

42. The method as recited in claim 38, wherein said sending a specification of a display parameter for formatting a particular data type of said data items comprises:
   sending said specification to format geocoded weather data to be represented at associated geolocations on a web viewer displayable map.

43. The method as recited in claim 38, wherein said sending a specification of a display parameter for formatting a particular data type of said data items comprises:
   sending said specification to extract geocoded data points from a data structure and represent said points at associated geolocations as markers on a web viewer displayable map.

44. The method as recited in claim 38, wherein said sending a specification of a display parameter for formatting a particular data type of said data items comprises:
   sending said specification to display a representation of a tracked object at a real-time geolocation of said tracked object on a web viewer displayable map.

45. The method as recited in claim 38, wherein said sending a specification of a display parameter for formatting a particular data type of said data items comprises:
   sending said specification to display a surveying data point cloud as a raster representation at associated geolocations on a web viewer displayable map.

46. The method as recited in claim 38, wherein said sending a specification of a display parameter for formatting a particular data type of said data items comprises:
   sending said specification to display recorded geocoded trip data at associated geolocations on a web viewer displayable map, wherein said trip data includes a route and one or more of recorded audio, recorded video, and an image associated with geolocations of said route.

47. The method of claim 1, wherein said at least two of said stored diverse data items comprises a third image of project schedule information, comprising alphanumeric numbers, describing a remaining project schedule, said method further comprising:
   overlaying said first and second image with said third image.

* * * * *